US010495239B2

(12) United States Patent
Korobkov

(10) Patent No.: US 10,495,239 B2
(45) Date of Patent: *Dec. 3, 2019

(54) DUCT FABRICATED WITH ADDITIVE MANUFACTURING FROM A RUN OF MATERIAL IN THE FORM OF ONE OR MORE SPIRALS

(71) Applicant: Arevo, Inc., Santa Clara, CA (US)

(72) Inventor: Andrei Korobkov, Sunnyvale, CA (US)

(73) Assignee: Arevo, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/047,096

(22) Filed: Jul. 27, 2018

(65) Prior Publication Data

US 2018/0335169 A1 Nov. 22, 2018

Related U.S. Application Data

(63) Continuation of application No. 15/459,747, filed on Mar. 15, 2017, now Pat. No. 10,077,854.

(51) Int. Cl.
*F16L 9/12* (2006.01)
*B33Y 80/00* (2015.01)
*B33Y 50/02* (2015.01)
*B29C 64/118* (2017.01)
*H04N 1/40* (2006.01)
*B29C 64/112* (2017.01)
*B29C 64/386* (2017.01)
*B29L 23/00* (2006.01)
*F16L 9/16* (2006.01)

(52) U.S. Cl.
CPC .............. *F16L 9/12* (2013.01); *B29C 64/112* (2017.08); *B29C 64/118* (2017.08); *B29C 64/386* (2017.08); *B33Y 50/02* (2014.12); *B33Y 80/00* (2014.12); *H04N 1/40* (2013.01); *B29L 2023/22* (2013.01); *F16L 9/16* (2013.01)

(58) Field of Classification Search
CPC ...... F16L 9/006; F16L 9/127; B28K 2501/06; B33Y 80/00
USPC .......................... 138/129, 144, 177, DIG. 11
See application file for complete search history.

(56) References Cited

U.S. PATENT DOCUMENTS

| | | | |
|---|---|---|---|
| 1,196,973 | A | 9/1916 | Palmer |
| 3,926,223 | A | 12/1975 | Petzetakis |
| 5,679,456 | A | 10/1997 | Sakai et al. |
| 5,936,861 | A | 8/1999 | Jang et al. |
| 6,934,600 | B2 | 8/2005 | Jang et al. |
| 9,422,024 | B2 | 8/2016 | Al-Sheyyab et al. |
| 2002/0190451 | A1 | 12/2002 | Sancaktar et al. |
| 2013/0069264 | A1 | 3/2013 | Giordano et al. |
| 2014/0202577 | A1 | 7/2014 | Webster, III |

(Continued)

FOREIGN PATENT DOCUMENTS

EP 3067184 A1 9/2016

OTHER PUBLICATIONS

Written Opinion of the International Preliminary Examing Authority, PCT/US2018/021074, dated Feb. 21, 2019.

(Continued)

*Primary Examiner* — Patrick F Brinson
(74) *Attorney, Agent, or Firm* — McGeary Cukor LLC; Jason Paul DeMont; Kenneth Ottesen

(57) ABSTRACT

Ducts manufactured by depositing one or more runs of material in a helix, a plurality of conjoined planar spirals, and a conjoined plurality of conical spirals.

12 Claims, 30 Drawing Sheets

(56) References Cited

U.S. PATENT DOCUMENTS

| | | |
|---|---|---|
| 2014/0291885 A1 | 10/2014 | Etchegoyen et al. |
| 2014/0296414 A1 | 10/2014 | Hattori et al. |
| 2016/0031155 A1 | 2/2016 | Tyler |
| 2016/0209820 A1 | 7/2016 | Banadyga et al. |
| 2016/0263832 A1 | 9/2016 | Bui et al. |
| 2016/0354756 A1 | 12/2016 | Kamler |
| 2017/0274583 A1 | 9/2017 | Vernon |

OTHER PUBLICATIONS

International Preliminary Report on Patentability, PCT/US2018/021074, dated Jun. 13, 2019.
Written Opinion of the International Searching Authority, PCT/US2018/021074, dated Jun. 14, 2018.
International Search Report, PCT/US2018/021074, dated Jun. 14, 2018.
Written Opinion of the International Searching Authority, PCT/US2018/021091, dated Jun. 14, 2018.
International Search Report, PCT/US2018/021091, dated Jun. 14, 2018.
USPTO, Office action, U.S. Appl. No. 15/459,747, dated Apr. 19, 2018.
USPTO, Office action, U.S. Appl. No. 15/459,630, dated Apr. 20, 2018.
USPTO, Notice of Allowance, U.S. Appl. No. 15/459,630, dated Jun. 26, 2018.

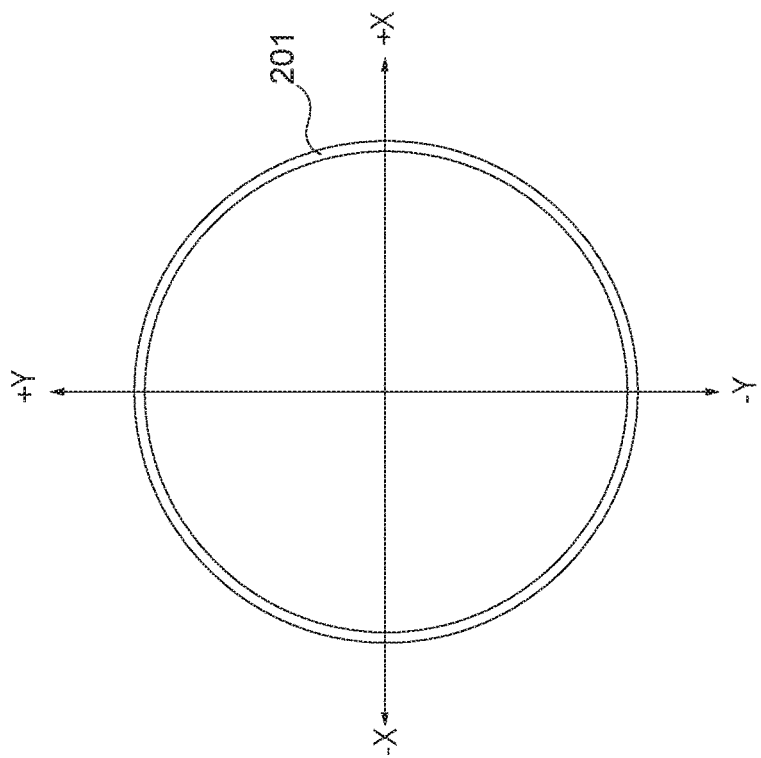
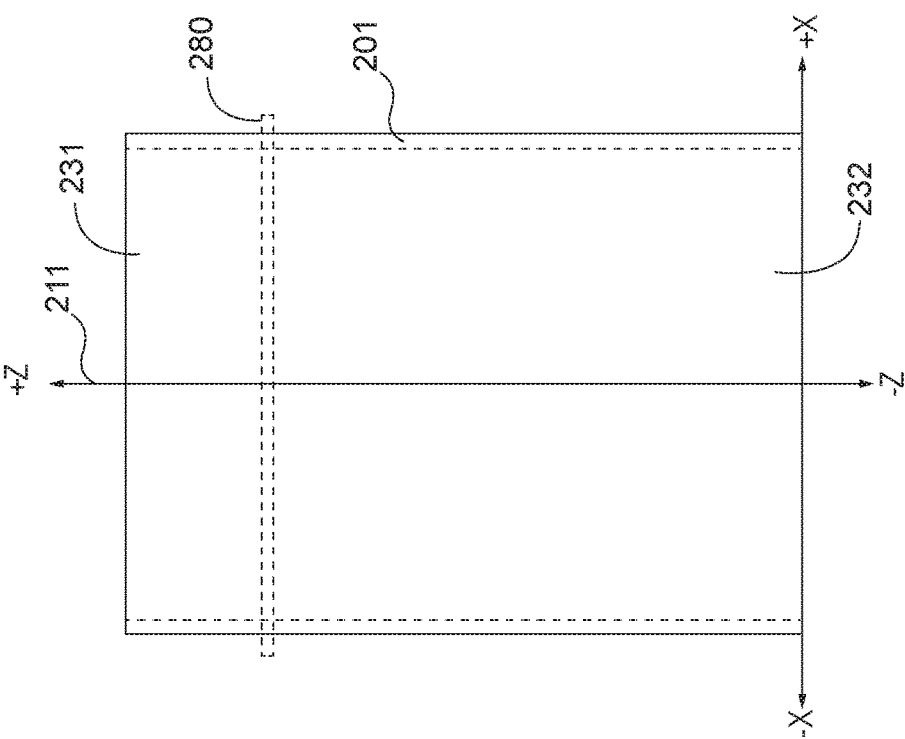
FIG. 2C
FIG. 2B

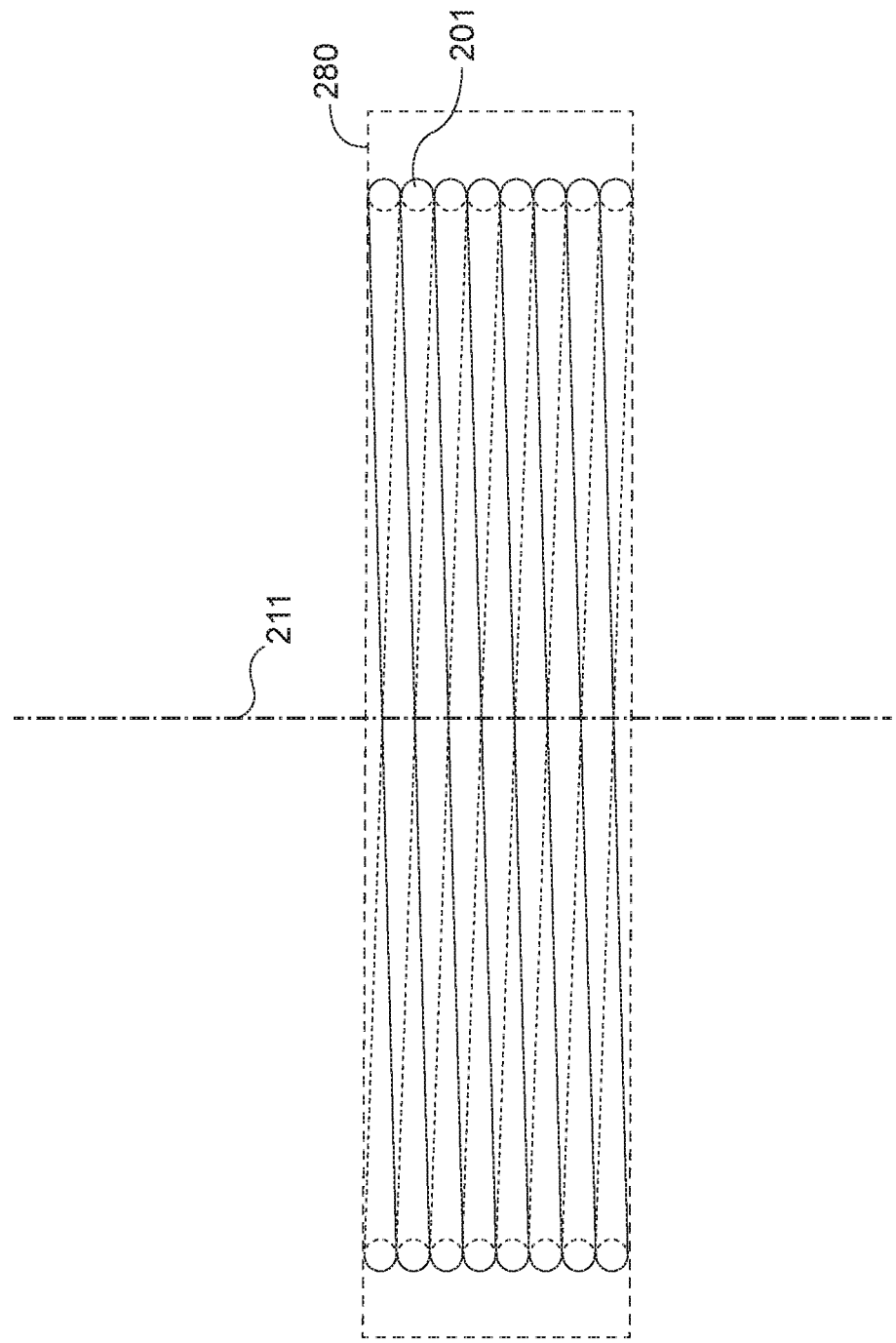

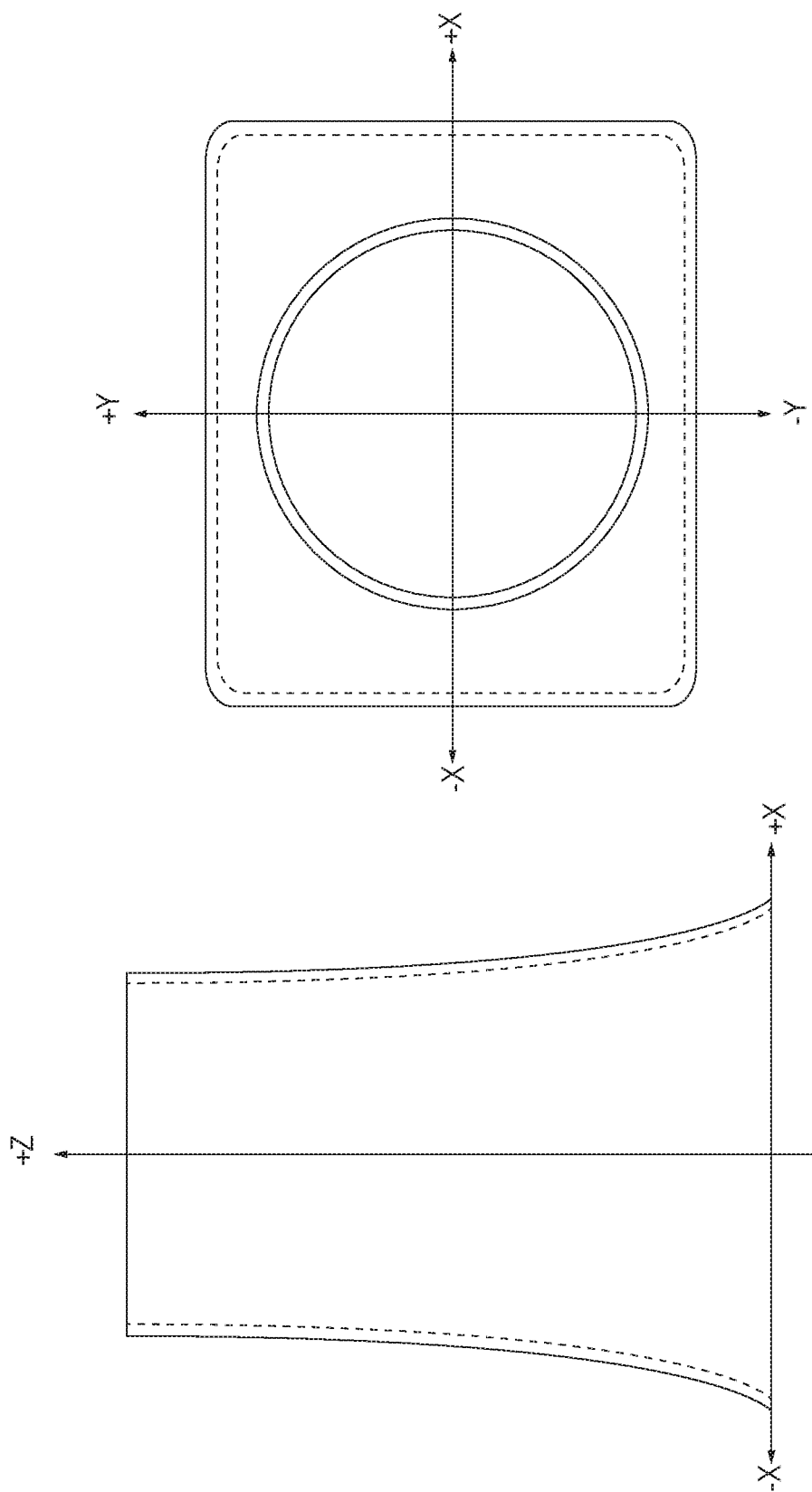

Spiral PS[ j ]
(For Odd j)

Spiral PS[ j ]
(For Even j)

Conical Spiral CS[ k ]
(Plan View)

Conical Spiral CS[ j ] (For Odd j)
(Perspective View)

Conical Spiral CS[ j ] (For Odd j)
(Elevation View)

Conical Spiral CS[ j ] (For Even j)
(Perspective View)

Conical Spiral CS[ j ] (For Even j)
(Elevation View)

DUCT FABRICATED WITH ADDITIVE MANUFACTURING FROM A RUN OF MATERIAL IN THE FORM OF ONE OR MORE SPIRALS

STATEMENT OF RELATED APPLICATIONS

The following patent applications are incorporated by reference for their description of how to make and use additive manufacturing system 100:
  U.S. patent application Ser. No. 15/375,832, filing date Dec. 12, 2016;
  U.S. patent application Ser. No. 15/232,767, filing date Aug. 9, 2016;
  U.S. patent application Ser. No. 14/574,237, filing date Dec. 17, 2014; and
  U.S. patent application Ser. No. 14/623,471, filing date Feb. 16, 2015.
U.S. patent application Ser. No. 15/459,630, filed on Mar. 15, 2017, entitled "Curvilinear Duct Fabricated With Additive Manufacturing" is incorporated by reference for its description of how to manufacture curvilinear ducts using helices, planar spirals, and conical spirals. U.S. patent application Ser. No. 15/459,747, filed on Mar. 15, 2017, is incorporated by reference herein.

FIELD OF THE INVENTION

The present invention relates to additive manufacturing, which is often colloquially called "3D Printing," in general, and, more particularly, to manufacturing ducts with additive manufacturing.

BACKGROUND

Additive manufacturing is a technique for building a three-dimensional object from a mathematical model of the object. In the additive manufacturing technique called fused-deposition modeling, the object is built by feeding a thermoplastic filament into a heated deposition head. The heated deposition head melts and deposits the molten thermoplastic material as one or more runs of material. Typically, a run of material is shaped like a thread or like the toothpaste that is squeezed from a tube but much smaller. When a run is deposited, it is just slightly above its melting point. After it is deposited, the run quickly solidifies and fuses with the runs that it touches.

Perhaps the greatest advantage of additive manufacturing is that it can build an object of any shape. To accomplish this, however, there are constraints on the sequence in which the runs can be deposited. First, each run must be supported. In other words, a run cannot be deposited on air. Therefore, each run must be deposited on:
  (i) a platform that is not part of the object, or
  (ii) one or more previously-deposited runs that will be part of the object, or
  (iii) a temporary scaffold of support material that is not part of the object, or
  (iv) any combination of i, ii, and iii.
Second, when a three-dimensional surface is sealed, it is no longer possible to deposit a run inside of that surface. This is analogous to the situation in which once you close a box, you can't put anything into the box.

There is a general methodology that is used in additive manufacturing that satisfies these constraints and enables the building of an object of any shape. The three-dimensional model of the object is modeled as thousands of thin horizontal layers. Each layer is modeled as thousands of runs and voids. The object is then built, one run at a time, one layer at a time, only in the ±X, ±Y, and +Z directions.

There are, however, costs and disadvantages associated with traditional additive manufacturing.

SUMMARY OF THE INVENTION

Embodiments of the present invention are able to fabricate ducts with additive manufacturing without some of the costs and disadvantages for doing so in the prior art. For example, some of the ducts that are fabricated in accordance with the illustrative embodiments have more advantageous mechanical properties in comparison to ducts fabricated using prior art techniques.

Furthermore, some of the ducts that are manufactured in accordance with the illustrative embodiments comprise a continuous run of material, which enables advantageous mechanical properties in comparison to ducts that are manufactured with a plurality of discontinuous runs of material.

The run of material in some embodiments of the present invention is a continuous tow of thermoplastic-impregnated carbon fiber. In contrast, the run of material in some alternative embodiments of the present invention comprises chopped carbon fibers that are impregnated with thermoplastic. It will be clear to those skilled in the art, after reading this disclosure, how to make and use alternative embodiments of the present invention in which the run of material is any satisfactory material.

A first illustrative duct is manufactured by depositing the run of material in a conjoined helix, in which each turn of the helix touches and fuses to the adjacent turns of the helix.

A second illustrative duct is manufactured by depositing the run of material in a conjoined stack of conjoined planar spirals. The planar spirals are conjoined because each turn in a spiral touches and fuses to the adjacent turns of the same spiral. The stack is itself conjoined because each planar spiral touches and fuses to the adjacent planar spirals above and below it.

A third illustrative duct is manufactured by depositing the run of material in a conjoined stack of conical spirals. The stack of conical spirals is conjoined because each turn in each conical spiral touches and fuses to the turns in the adjacent conical spirals above, below and to the side of it.

All dimensions and coordinates in this specification are stated in millimeters in a right-hand Cartesian and/or cylindrical coordinate system. It will be clear to those skilled in the art how to convert from one coordinate system to the other, and both coordinate systems will be used interchangeably. It will, however, be clear to those skilled in the art, after reading this disclosure, how to make and use alternative embodiments of the present invention that use any (small "m") metric system and any coordinate system.

It will be clear to those skilled in the art, after reading this disclosure, that the geometric descriptions of the illustrative embodiments are ideals and that the imperfection of manufacturing might produce objects with inconsequential differences in dimensions and geometry.

BRIEF DESCRIPTION OF THE DRAWINGS

FIG. 2B depicts an elevation view of duct 200.

FIG. 2C depicts a plan view of duct 200.

FIG. 2D depicts a cross-section view of duct 200 along the Z=0 X-Y plane enlarged for magnification purposes.

FIG. 4B depicts an elevation view of duct 400.

FIG. 4C depicts a plan view of duct 400.

DETAILED DESCRIPTION

For the purposes of this specification, the following terms and their inflected forms are defined as follows:

The term "duct" is defined as an item of manufacture that is capable of directing the flow of a fluid.

The term "pipe" is defined as a synonym of duct.

Figure 1:
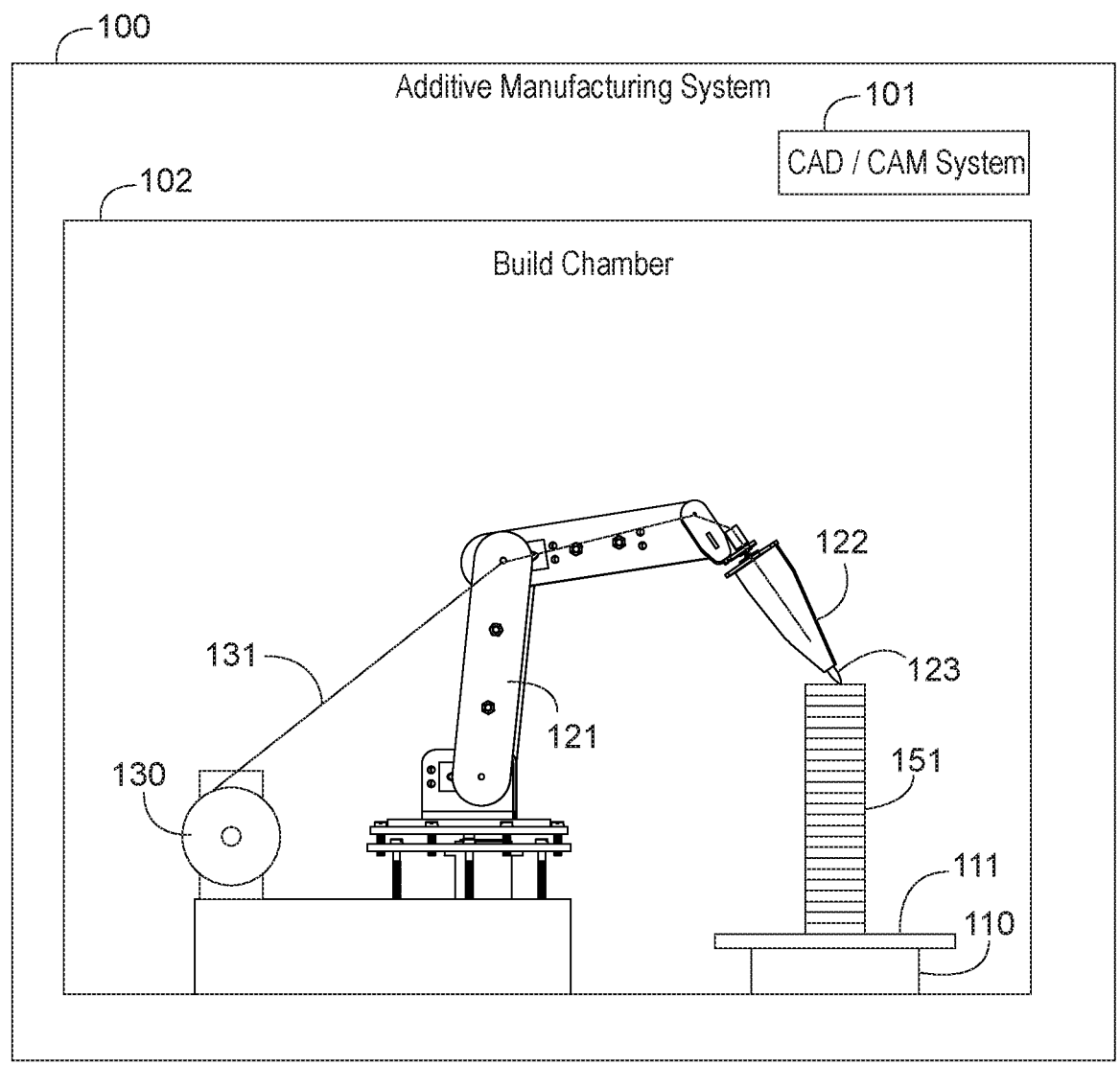
FIG. 1 depicts an illustration of the salient components of additive manufacturing system 100 in accordance with the illustrative embodiment of the present invention.

FIG. 1 depicts an illustration of the salient components of additive manufacturing system 100 in accordance with the illustrative embodiment of the present invention. Additive manufacturing system 100 comprises: CAD/CAM system 101, build chamber 102, turn-table 110, deposition platform 111, robotic arm 121 (which itself comprises deposition head 122 and deposition nozzle 123), thermoplastic filament spool 130, and thermoplastic filament 131. The purpose of manufacturing system 100 is to manufacture object 151.

CAM controller 101 comprises the hardware and software necessary to direct build chamber 102, control robotic arm 121, deposition head 122, deposition nozzle 123, and turn-table 110 to manufacture object 151. It will be clear to those skilled in the art, after reading this disclosure, how to make and use CAM controller 101.

Build chamber 102 is a thermally-insulated, temperature-controlled environment in which object 151 is manufactured. It will be clear to those skilled in art how to make and use build chamber 102.

Turn-table 110 comprises a stepper motor under the control of CAM controller 101 that is capable of rotating platform 111 (and, consequently object 151) around the Z-axis. In particular, turn-table 110 is capable of:

i. rotating platform 111 clockwise around the Z-axis from any angle to any angle, and ii. rotating platform 111 counter-clockwise around the Z-axis from any angle to any angle, and iii. rotating platform 111 at any rate, and iv. maintaining (statically) the position of platform 111 at any angle.

It will be clear to those skilled in the art how to make and use turn-table 110.

Platform 111 comprises hardware on which object 151 is manufactured. It will be clear to those skilled in the art how to make and use platform 111.

Robotic arm 121 is a seven-axis arm capable of placing deposition nozzle 123 at any location in the build volume of object 151 and from any approach angle. Furthermore, robotic arm can move deposition nozzle 123 in:

i. the +X direction,
    ii. the −X direction,
    iii. the +Y direction,
    iv. the −Y direction,
    v. the +Z direction,
    vi. the −Z direction, and
    vii. any combination of i, ii, iii, iv, v, and vi while rotating the approach angle of deposition nozzle 123 around any point or temporal series of points. It will be clear to those skilled in the art how to make and use robotic arm 121.

Deposition head 122 is hardware that heats and deposits filament 131 (which may partially or wholly contain one or more fiber strands) via deposition nozzle 123.

Thermoplastic filament 131 comprises chopped carbon fiber, but it will be clear to those skilled in the art, after reading this disclosure, how to make and use alternative embodiments of the present invention in which thermoplastic filament 131 has a different fiber composition as described in U.S. patent application Ser. No. 14/184,010, which is incorporated by reference.

Thermoplastic filament 131 is deposited as a "run of material," which is not shown in FIG. 1 as distinct from object 151. The physical and geometric properties of the runs of material are described below and in the accompanying figures.

Single-Turn Straight Ducts—A Conjoined Helix

Figure 2A:
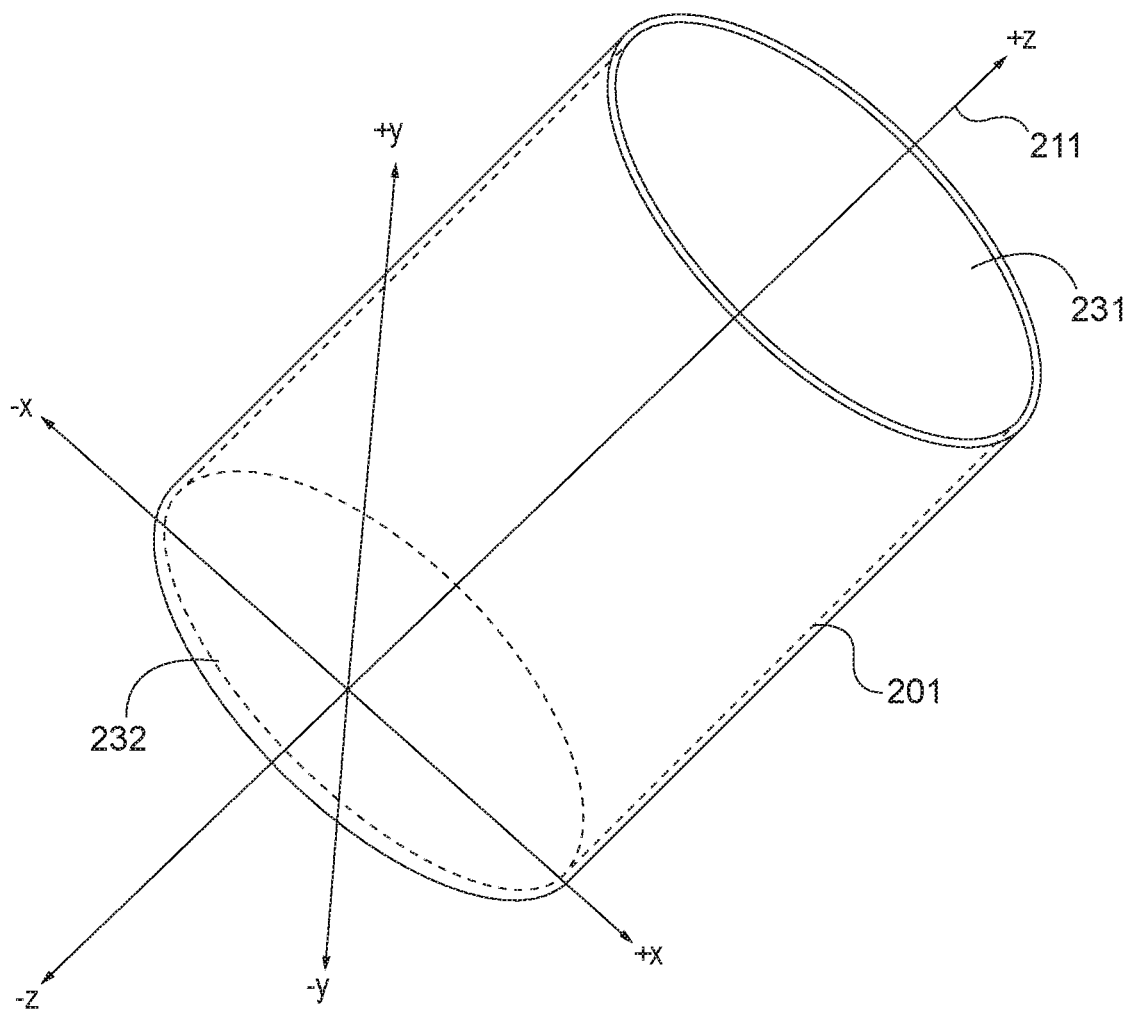
FIG. 2A depicts an illustration of a perspective view of duct 200, which is an illustrative embodiment of the present invention.

FIG. 2A depicts an illustration of a perspective view of duct 200, which is an illustrative embodiment of the present invention. FIG. 2B depicts an elevation view of duct 200; FIG. 2C depicts a plan view of duct 200, and FIG. 2D depicts a cross-section view of duct 200 along the Y=0 X-Z plane enlarged for magnification purposes.

Duct 200 is a straight, single-turn circular cylindrical duct that is capable of directing the flow of a fluid between opening 231 and opening 232. Duct 200 has a length L of 100 millimeters as measured along duct axis 211. Duct 200 has mean diameter D of 70 millimeters. The wall of duct 200 is 0.3 millimeters thick and comprises a single turn of a run of material. It will be clear to those skilled in the art, after reading this disclosure, how to make and use alternative embodiments of the present invention that have of any length, any diameter, and any wall thickness.

Duct 200 is manufactured by depositing a continuous run of material—run of material 201—in the form of a conjoined helix around duct axis 211. In the illustrative embodiment, duct axis 211 is the Z-axis. The details of the conjoined helix are described below and in the accompanying figures.

Run of material 201 comprises a continuous tow of carbon fibers that are impregnated with thermoplastic, but it will be clear to those skilled in the art, after reading this disclosure, how to make and use alternative embodiments of the present invention in which run of material 201 comprises a different material.

Figure 2E:
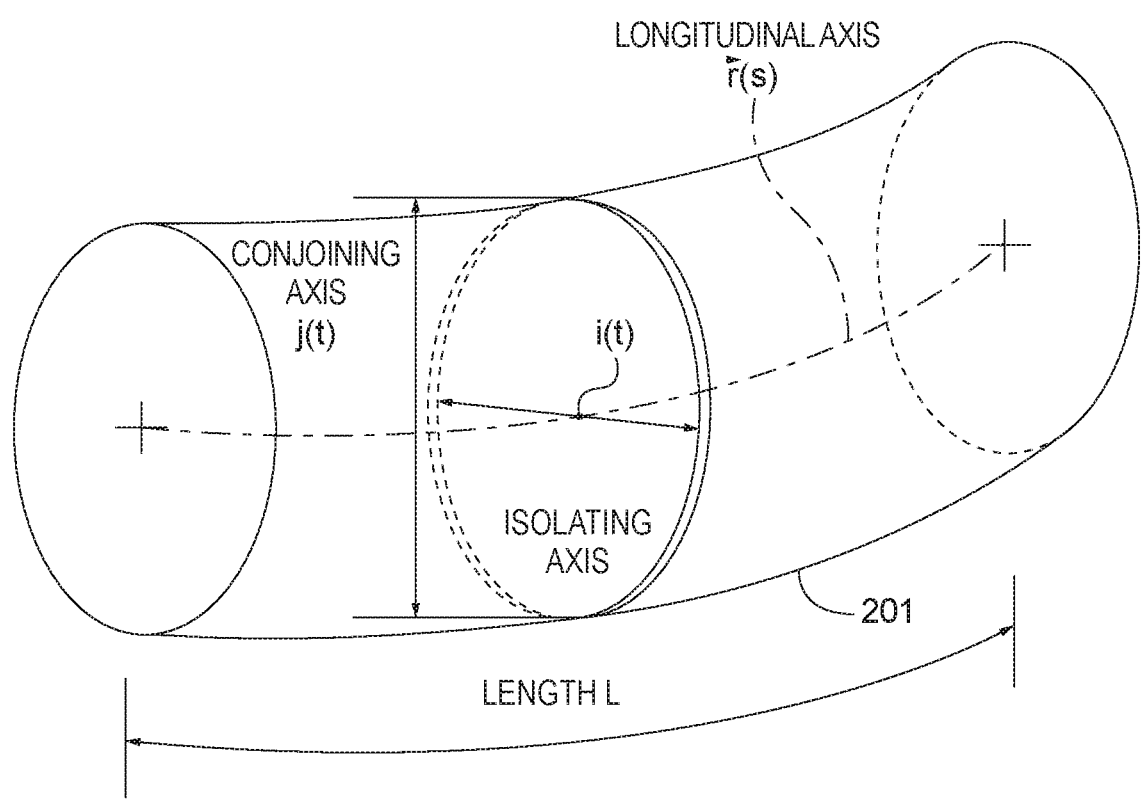
FIG. 2E depicts a perspective view of a portion of a run of material that enlarged for magnification purposes.

In order to facilitate a technical and accurate understanding of the illustrative embodiments of the present invention, FIG. 2E depicts a perspective view of a portion of a run of material that is enlarged for magnification purposes. As shown in FIG. 2E, the run of material comprises longitudinal axis 202. A location along a longitudinal axis is designated location $\vec{r}(s)$.

The cross section of a run of material at location $\vec{r}(s)$ is approximately an ellipse. It will be clear to those skilled in the art, however, after reading this disclosure, how to make and use alternative embodiments of the present invention in which the cross-section has another shape (e.g., a circle, a triangle, a rectangle, a square, a hexagon, an octagon, a dodecagon, an irregular shape, etc.).

Figure 13:
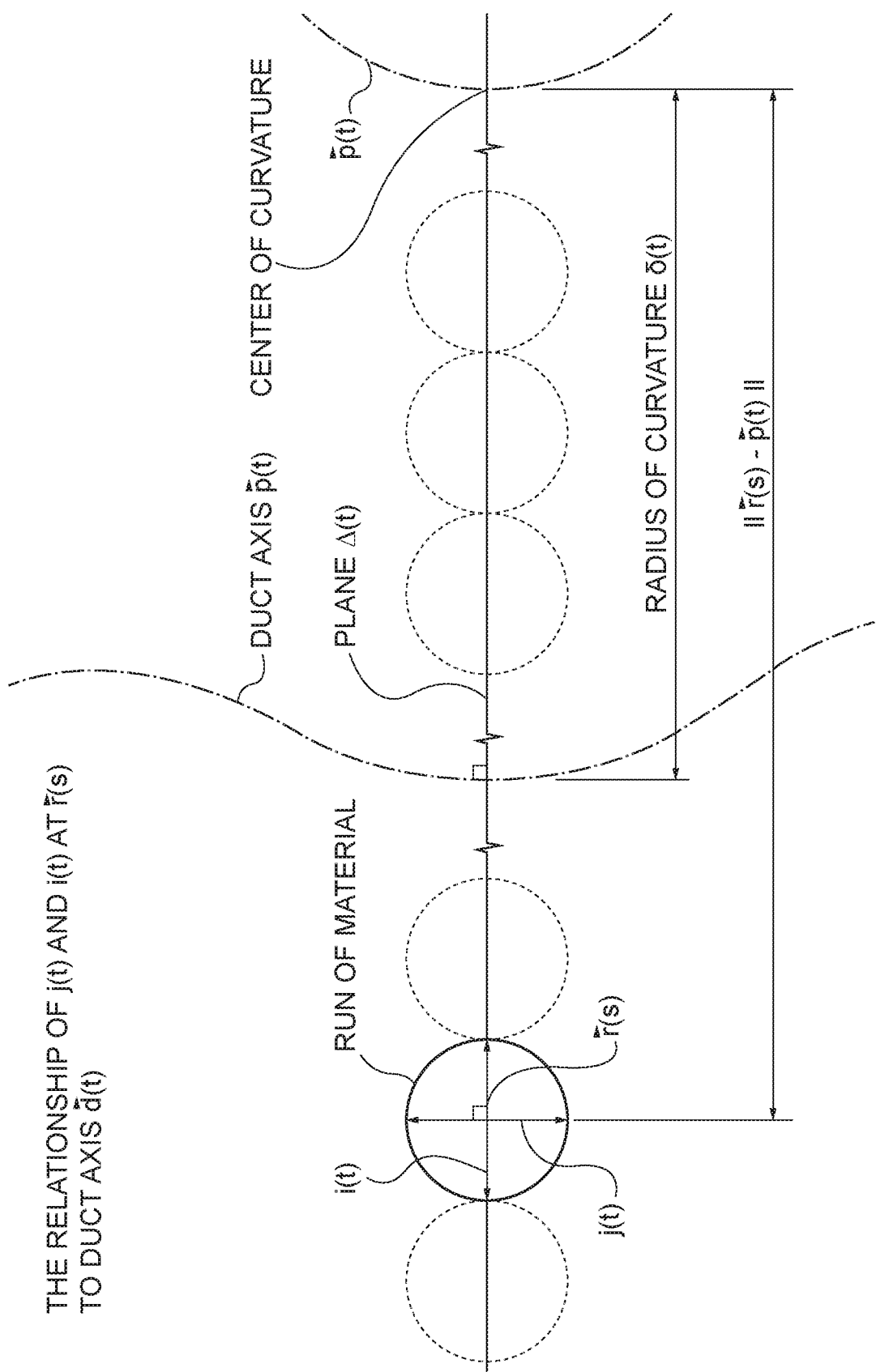
FIG. 13 depicts an illustration of the relationship of the conjoining axis j(t) and the isolating axis i(t) to the duct axis $\vec{d}(t)$ and the longitudinal axis $\vec{r}(s)$ of the run of material.

The dimensions of the cross section of a run of material at location $\vec{r}(s)$ are defined by two measurements:

i. the conjoining axis j(t), and
    ii. the isolating axis i(t)

that are measured in relation to a plane Δ(t) that goes through location $\vec{r}(s)$ and is perpendicular to duct axis $\vec{d}(t)$. In particular, the conjoining axis j(t) of the run of material at $\vec{r}(s)$ is perpendicular to the plane Δ(t) at $\vec{r}(s)$. The isolating axis i(t) of the run of material at $\vec{r}(s)$ is on the line in the plane Δ(t) that connects $\vec{r}(s)$ and $\vec{d}(t)$. The relationship of the conjoining axis j(t) and the isolating axis i(t) to the duct axis $\vec{d}(t)$ and the longitudinal axis $\vec{r}(s)$ of the run of material is illustrated in FIG. 13. When the conjoining axis j(t) is a constant for all values of the parameter t in an embodiment of the present invention, it may be represented by J. Similarly, when the isolating axis i(t) is a constant for all values of the parameter t in an embodiment of the present invention, it may be represented by I.

In accordance with the illustrative embodiment, system 100 is capable of modulating, as a function of the parameter t, the conjoining axis j(t) between 0.1 millimeters and 0.5 millimeters. It will be clear to those skilled in the art, after reading this disclosure, how to make and use alternative embodiments of the present invention in which the conjoining axis j(t) has any range of values.

In accordance with the illustrative embodiment, system 100 is capable of maintaining the value of the isolating axis i(t) as a constant 0.3 millimeters while the value of the conjoining axis j(t) varies. Alternatively, system 100 is capable of varying the value of the isolating axis i(t) in proportion to the value of the conjoining axis j(t).

The wall of duct 200 comprises a single-turn of the run of material from which duct 200 is manufactured, and, therefore, the thickness of the wall is substantially equal to the isolating axis i(t) of the run of material. In contrast and as described below, the wall of some alternative ducts comprises multiple turns of the run of material, and, therefore, the thickness of those walls is greater.

Returning to FIGS. 2A through 2D and duct 200, the measurement of the isolating axis i(t)=I=0.3 millimeters and the conjoining axis j(t)=J=0.25 millimeters. It will be clear to those skilled in the art, however, after reading this disclosure, how to make and use alternative embodiments of the present invention in which the isolating axis i(t) is any value and the conjoining axis j(t) is any value.

To manufacture duct 200, deposition nozzle 123 deposits run of material 201 in a circular helix H. Because duct 200 is 100 millimeters long as measured along duct axis 211 and the conjoining axis j(t) is 0.25 millimeters, the helix H comprises 100/0.25=400 turns (i.e., 800π radians) of run of material 201. It will be clear to those skilled in the art, after reading this disclosure, how to make and use alternative embodiments of the present invention that comprise any number of turns of run of material.

The longitudinal axis of run of material 201 is a helix, which can be conceptualized as an advancing point on a circle that is perpendicular to—and whose center traverses—duct axis 211. In other words, the space curve representing run of material 201 is not trivial.

To simplify the description of the space curve representing run of material 201, the space curve for duct axis 211 is described first, and then the space curve for the longitudinal axis of run of material 201 is described as a function of the space curve for duct axis 211. It will be clear to those skilled in the art, after reading this disclosure, how to make and use alternative embodiments of the present invention that independently describe the space curve of the run of material without reference to the space curve for the duct axis.

The general form of the vector function for the space curve of duct axis 211 is:

$$\vec{d}(t) = \langle (a(t), b(t), c(t)) \rangle \tag{1a}$$

where t is a real number. It will be clear to those skilled in the art how to represent the space curve of any duct axis using mathematical techniques other than vector functions.

The particular vector function (in Cartesian coordinates) for duct axis 211 is:

$$a(t) = 0 \tag{1b}$$

$$b(t) = 0 \tag{1c}$$

$$c(t) = t \tag{1d}$$

where t is a real number with the domain t: [0, L]. It will be clear to those skilled in the art, after reading this disclosure, how to determine the vector function of any duct axis in any coordinate system.

The general form of the vector function for the space curve that is the longitudinal axis of a run of material is:

$$\vec{r}(s) = \langle f(s), g(s), h(s) \rangle \tag{2a}$$

where s is a real number. It will be clear to those skilled in the art how to represent the space curve of the longitudinal axis of a run of material using mathematical techniques other than vector functions.

The location of the longitudinal axis of run of material 201 (in the context of duct axis 211) is given by the vector function (in Cartesian coordinates):

$$f(s) = \frac{D}{2}\cos(s) \tag{Eq. 2b}$$

$$g(s) = \frac{D}{2}\sin(s) \tag{Eq. 2c}$$

$$h(s) = \frac{s}{8\pi} \tag{Eq. 2d}$$

where s is a positive real with the domain s: [0+J/2, 800π−J/2]. It will be clear to those skilled in the art, after reading this disclosure, how to determine the vector function of any conjoined helix in any coordinate system.

In accordance with the illustrative embodiment, the respective turns of helix H are conjoined such that the material at location $$\langle f(s), g(s), h(s) \rangle \tag{3a}$$

touches and fuses to the material at location $$\langle f(s-2\pi), g(s-2\pi), h(s-2\pi) \rangle \tag{3b}$$

for the interval s: [2π+J/2, 800π−J/2].

Figure 3A:
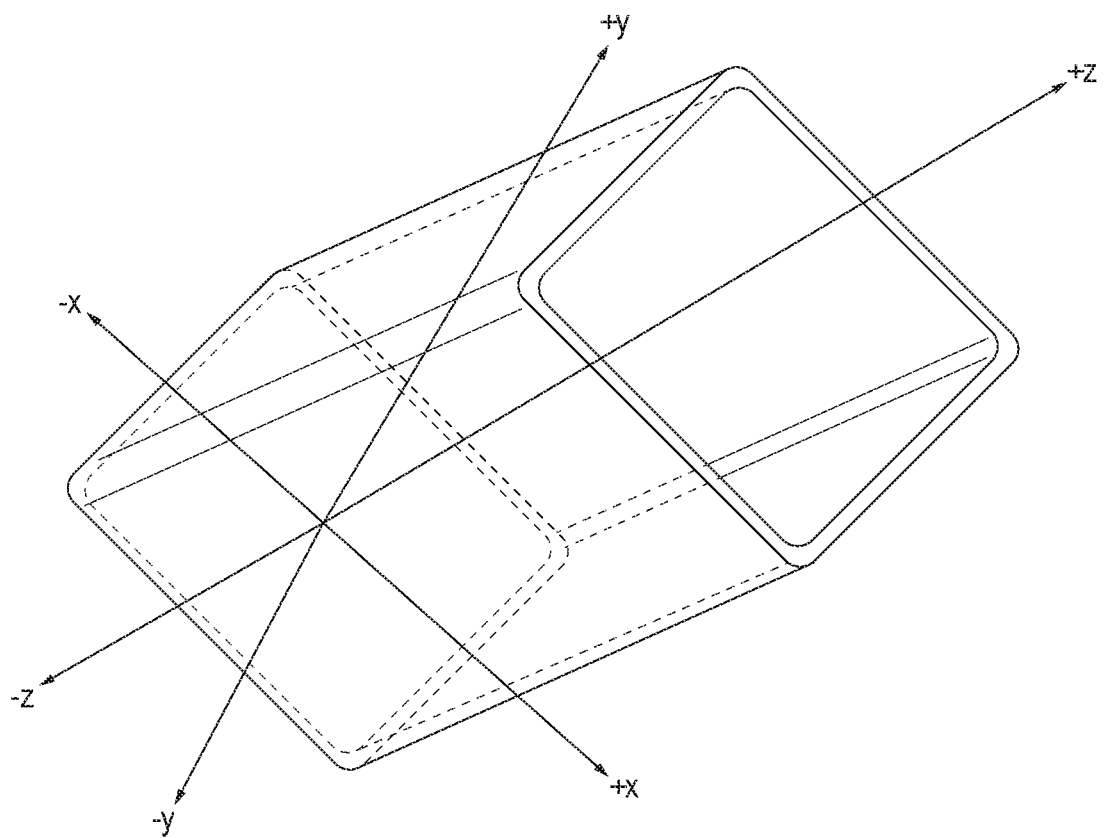
FIG. 3A depicts an illustration of a perspective view of duct 300 in accordance with an alternative embodiment of the present invention.
Figure 3C:
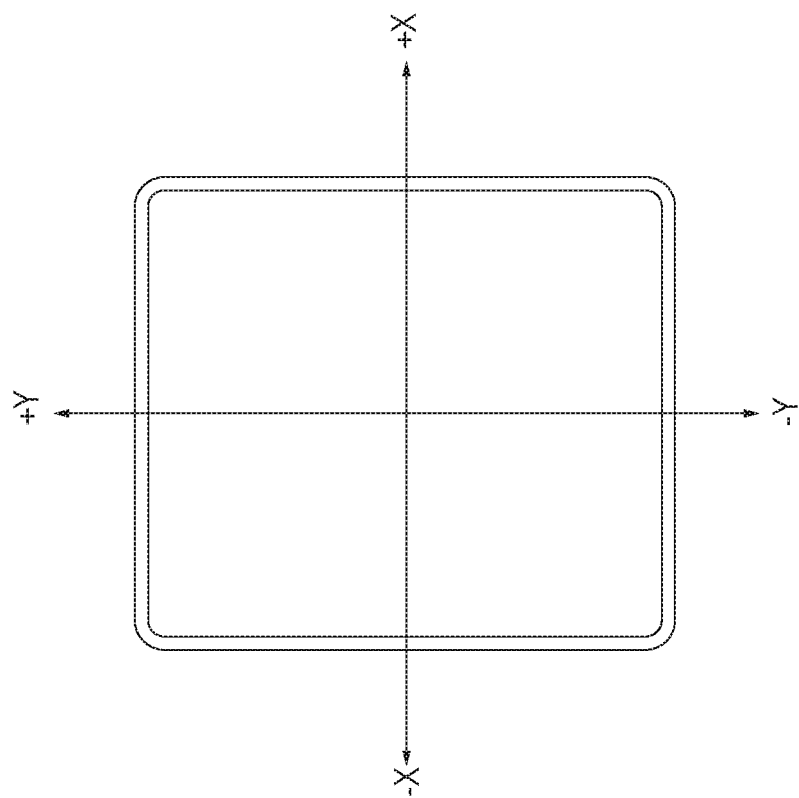
FIG. 3C depicts a plan view of duct 300.
Figure 3B:
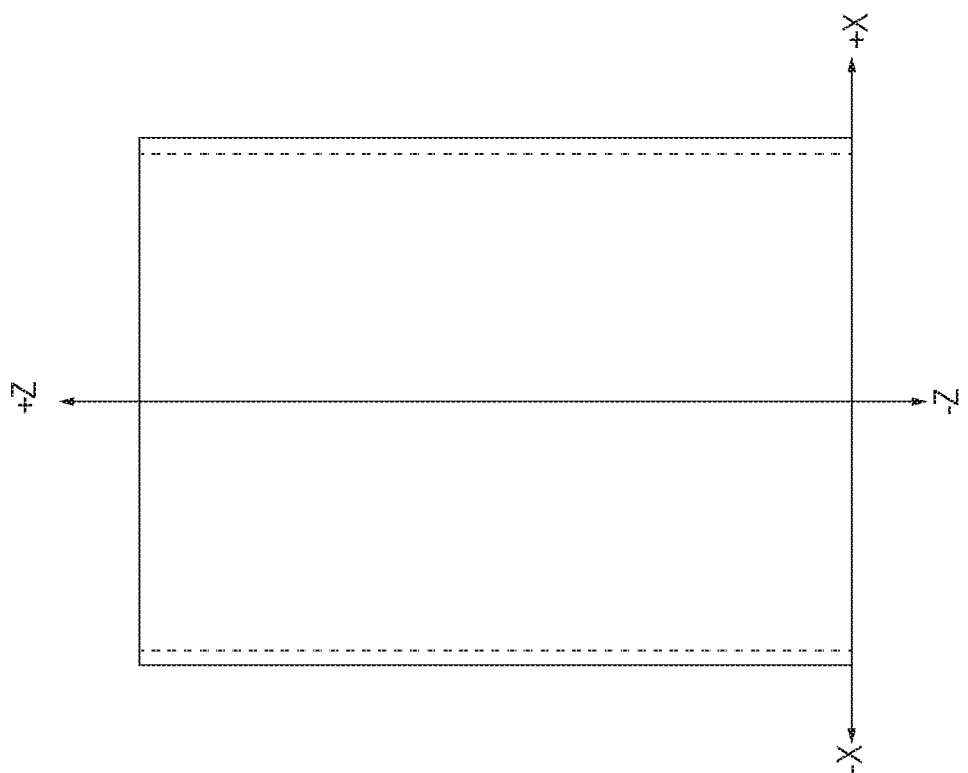
FIG. 3B depicts an elevation view of duct 300.

In FIGS. 2A and 2C it can be seen that duct 200 is circular cylinder (i.e., the radius of duct 200 is isotropic $\vec{d}(t)$ for all t), but will be clear to those skilled in the art, after reading this disclosure, how to make and use a conjoined helical duct in which the radius is anisotropic around $\vec{d}(t)$ for any or all t, and, therefore, provides a duct of shape (e.g., elliptical, rectangular, irregular, etc.). For example, FIG. 3A depicts an illustration of a perspective view of duct 300, which is a rectangular-with-rounded-corners conjoined helical duct. FIG. 3B depicts an elevation view of duct 300; FIG. 3C depicts a plan view of duct 300. It will be clear to those skilled in the art, after reading this disclosure, how to make and use duct 300.

Figure 4A:
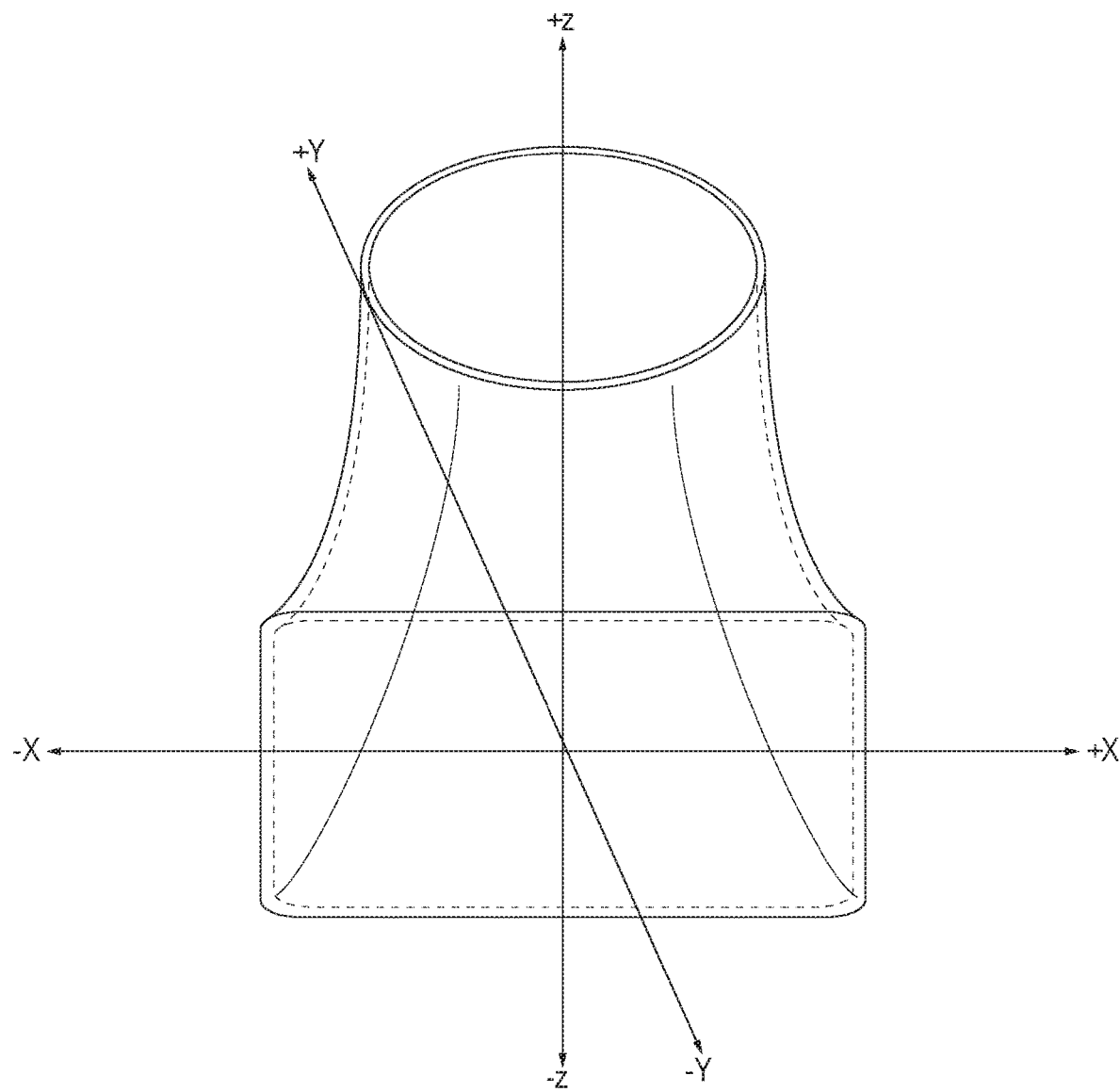
FIG. 4A depicts an illustration of a perspective view of duct 400 in accordance with an alternative embodiment of the present invention.

In FIGS. 2A and 2B it can be seen that duct 200 is a straight cylinder (i.e., the radius of duct 200 is constant), but it will be clear to those skilled in the art, after reading this disclosure, how to make and use alternative embodiments of the present invention in which the radius changes with t. For example, FIG. 4A depicts an illustration of a perspective view of duct 400, which is a circular-at one-end-rectangular-with-rounded-corners-at-the-other-end conjoined helical duct. FIG. 4B depicts an elevation view of duct 400; FIG. 4C depicts a plan view of duct 400. It will be clear to those skilled in the art, after reading this disclosure, how to make and use duct 400.

Multi-Turn Straight Ducts—Conjoined Stack of Conjoined Planar Spirals

Figure 5A:
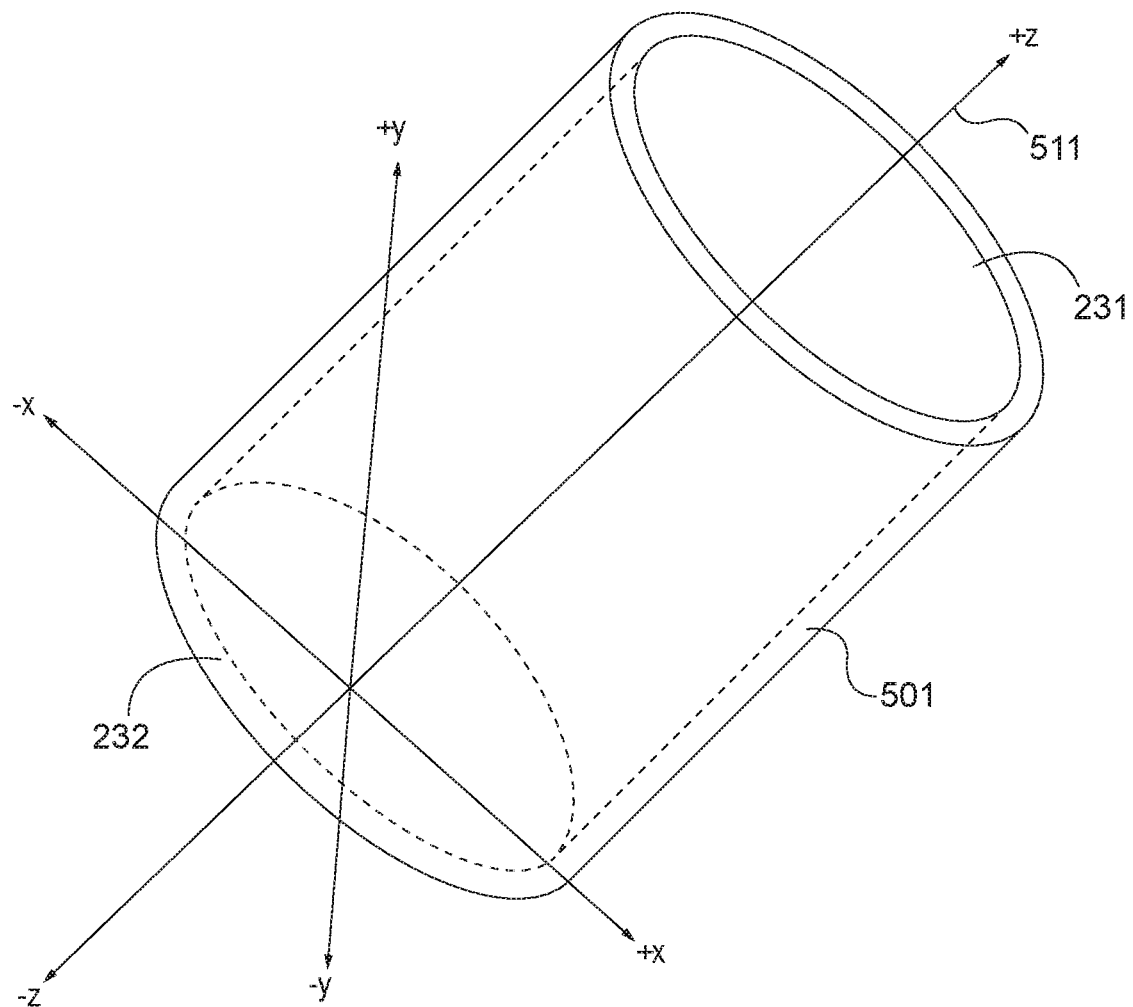
FIG. 5A depicts an illustration of a perspective view of duct 500, which is an illustrative embodiment of the present invention.
Figure 5C:
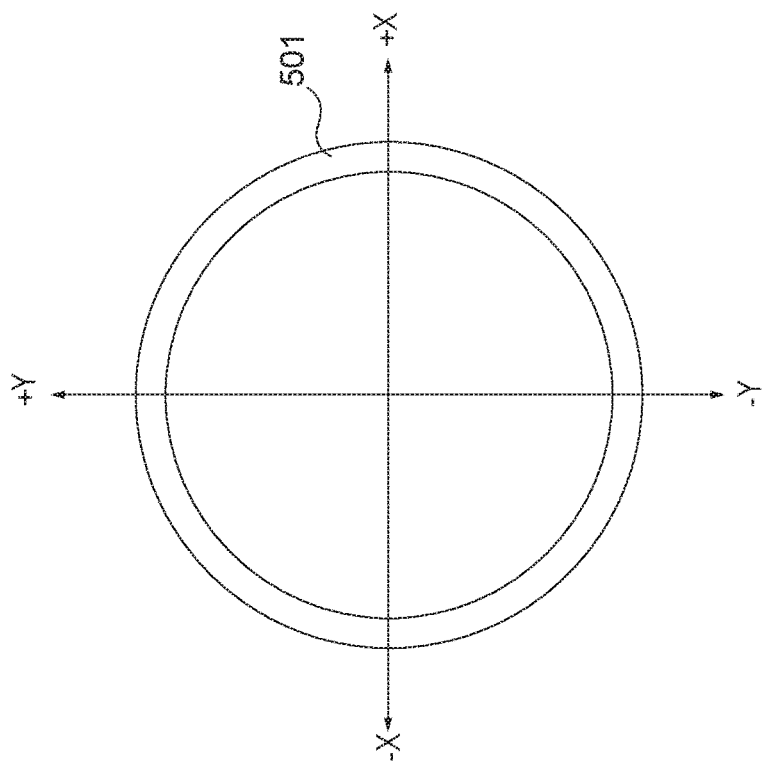
FIG. 5C depicts a plan view of duct 500.
Figure 5B:
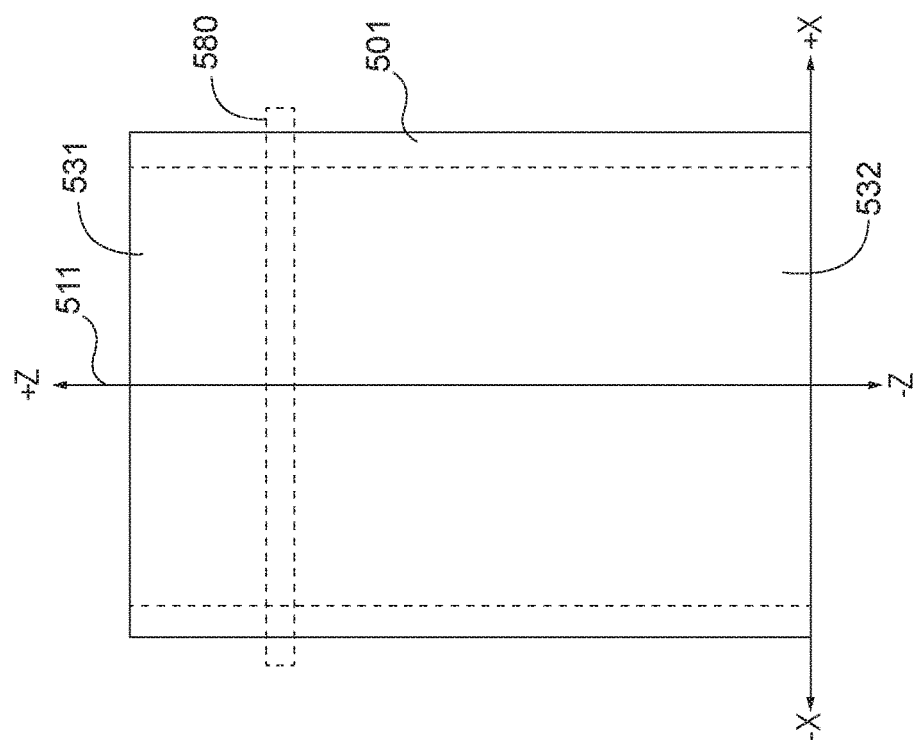
FIG. 5B depicts an elevation view of duct 500.
Figure 5D:
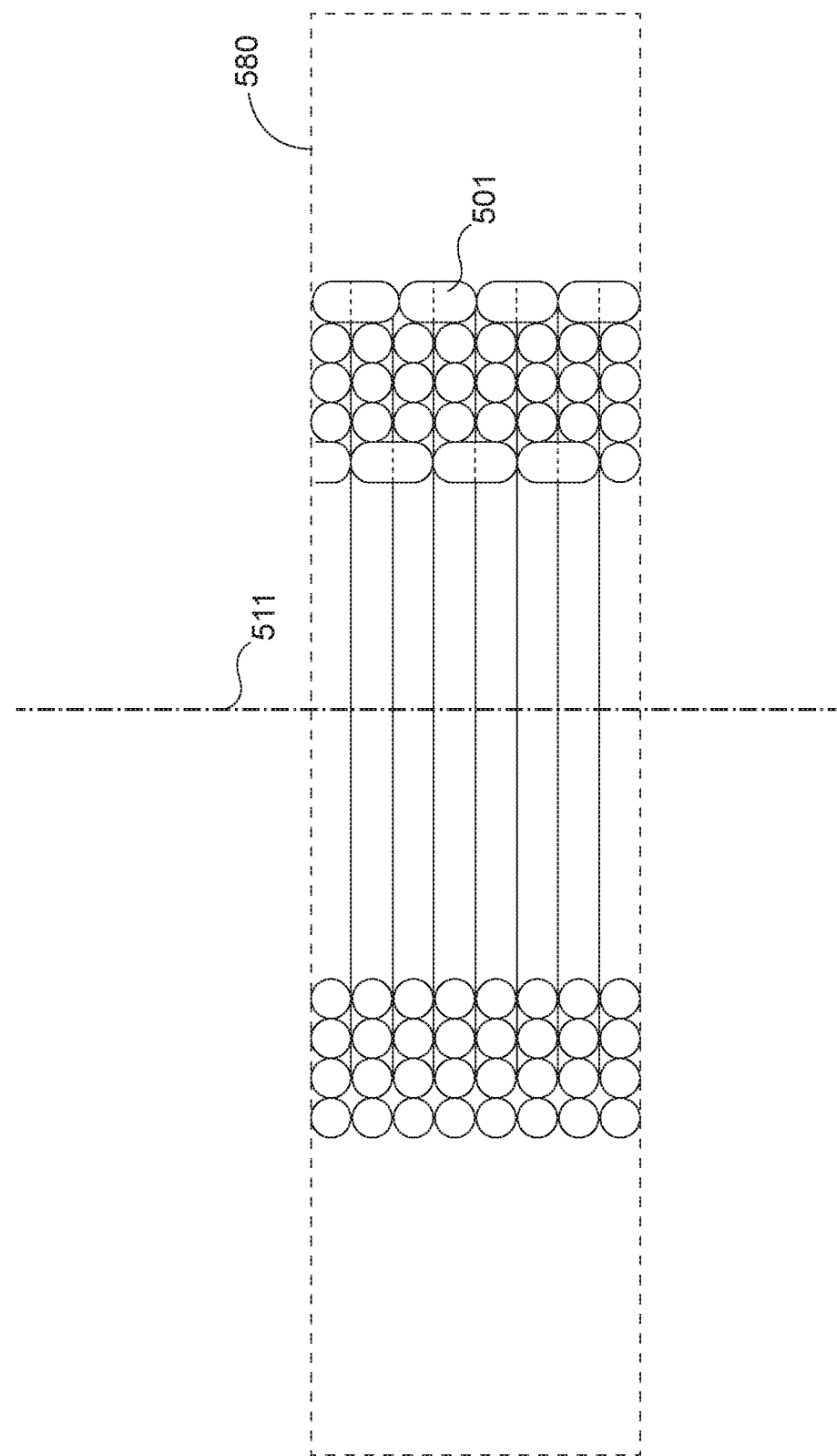
FIG. 5D depicts a cross-section view of duct 500 along the Z=0 X-Y plane enlarged for magnification purposes.

FIG. 5A depicts an illustration of a perspective view of duct 500, which is an illustrative embodiment of the present invention. FIG. 5B depicts an elevation view of duct 500, and FIG. 5C depicts a plan view of duct 500. FIG. 5D depicts a cross-section view of duct 500 along the Y=0 X-Z plane enlarged for magnification purposes (and not to scale).

Duct 500 is a straight, multi-turn circular cylindrical duct that is capable of directing the flow of a fluid between opening 531 and opening 532. Duct 500 has a length L of 100 millimeters as measured along duct axis 511. Duct 500 has mean diameter D of 70 millimeters. The wall of duct 500 is 1.2 millimeters thick and comprises four turns of a run of material. It will be clear to those skilled in the art, after reading this disclosure, how to make and use alternative embodiments of the present invention that have of any length, any diameter, and any wall thickness, and any number of turns.

Duct 500 is manufactured by depositing a continuous run of material—run of material 501—in the form of a conjoined stack of conjoined planar spirals, each of which is centered around duct axis 511. In the illustrative embodiment, duct axis 511 is the Z-axis. The details of the conjoined stack of planar spirals is described below and in the accompanying figures.

Run of material 501 comprises a continuous tow of carbon fibers that are impregnated with thermoplastic, but it will be clear to those skilled in the art, after reading this disclosure, how to make and use alternative embodiments of the present invention in which run of material 501 comprises a different material.

The measurement of the isolating axis is 0.3 millimeters and the conjoining axis j(t)=J is 0.25 millimeters. It will be clear to those skilled in the art, however, after reading this disclosure, how to make and use alternative embodiments of the present invention in which the isolating axis I is any value and the conjoining axis j(t) is any value.

Duct 500 comprises a conjoined stack of K conjoined planar spirals, wherein K is a positive integer. The K conjoined planar spirals are designated spiral PS[1], ..., PS[k], ..., PS[K], wherein k is a positive integer in the range k∈{1, ..., K}. Spiral PS[1] is deposited first, spiral PS[k+1] is deposited after and on spiral PS[k], and spiral PS[K] is deposited last.

Because duct 500 is 100 millimeters long as measured along duct axis 511 and the conjoining axis j(t)=J is 0.25 millimeters, duct 200 comprises K=100/0.25=400 planar spirals. It will be clear to those skilled in the art, after reading this disclosure, how to make and use alternative embodiments of the present invention that comprise any number of planar spirals.

To simplify the description of the space curve representing run of material 501, the space curve for duct axis 511 is described first, and then the space curve for the longitudinal axis of run of material 501 for all 400 planar spirals is described as a function of the space curve for duct axis 511. It will be clear to those skilled in the art, after reading this disclosure, how to make and use alternative embodiments of the present invention that independently describing the space curve of the run of material without reference to the space curve for the duct axis.

The general form of the vector function for the space curve of duct axis 511 is:

$$\vec{d}(t) = \langle a(t), b(t), c(t) \rangle \tag{4a}$$

where t is a real number. It will be clear to those skilled in the art how to represent the space curve of any duct axis using mathematical techniques other than vector functions.

The particular vector function (in Cartesian coordinates) for duct axis 511 is:

$$a(t)=0 \tag{4b}$$

$$b(t)=0 \tag{4c}$$

$$c(t)=t \tag{4d}$$

where t is a real number with the domain t: [0, L]. It will be clear to those skilled in the art, after reading this disclosure, how to determine the vector function of any duct axis in any coordinate system.

The general form of the vector function for the space curve that is the longitudinal axis of a run of material is:

$$\vec{r}(s,k) = \langle f(s,k), g(s,k), h(s,k) \rangle \tag{5a}$$

where s is a real number. It will be clear to those skilled in the art how to represent the space curve of the longitudinal axis of a run of material using mathematical techniques other than vector functions.

Figure 5E:
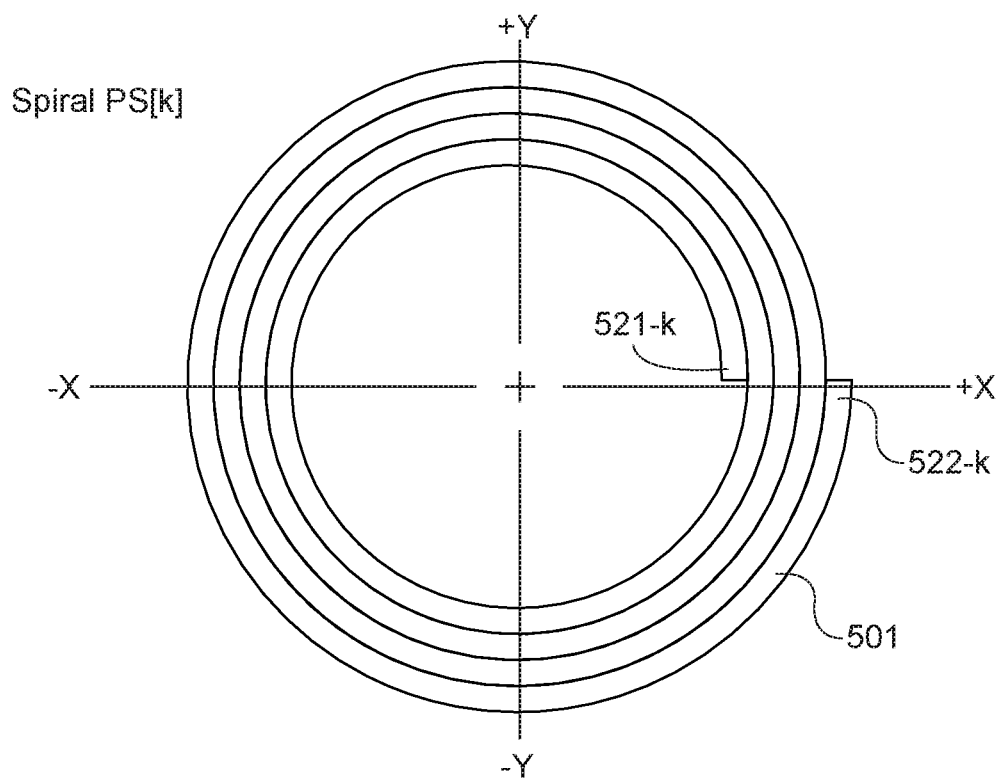
FIG. 5E depicts an illustration of a plan view of spiral PS[k]
Figure 5F:
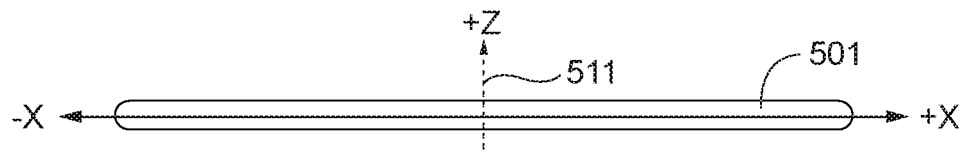
FIG. 5F depicts an illustration of an elevation view of spiral PS[k].
Figure 5G:
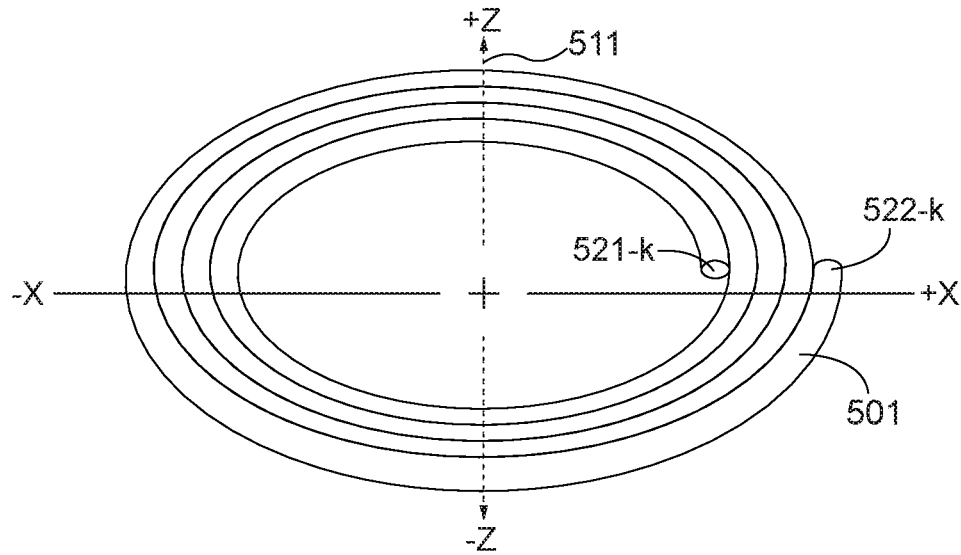
FIG. 5G depicts an illustration of an illustration of a perspective view of spiral PS[k].

FIG. 5E depicts an illustration of a plan view of spiral PS[k]; FIG. 5F depicts an illustration of an elevation view of spiral PS[k], and FIG. 5G depicts an illustration of an illustration of a perspective view of spiral PS[k].

Planar spiral PS[k] is centered around and is perpendicular to duct axis 511. It will be clear to those skilled in the art, after reading this disclosure, how to make and use alternative embodiments of the present invention in which one or more planar spirals are not perfectly planar and/or perfectly perpendicular to the duct axis and/or perfectly centered around the duct axis.

Furthermore, spiral PS[k] comprises medial terminus 521-k, lateral terminus 522-k, and four turns (i.e., T=8π radians) of run of material 501 between medial terminus 521-k and lateral terminus 522-k. It will be clear to those skilled in the art, after reading this disclosure, how to make and use alternative embodiments of the present invention in which the conjoined planar spirals comprise any number of (integral or fractional) turns.

The location of the longitudinal axis of run of material 201 (in the context of duct axis 511) is given by the vector function (in Cartesian coordinates):

$$f(s,k) = \left[D + I\left(\frac{T}{4\pi} - \frac{s}{2\pi}\right)\right]\cos(s) \tag{Eq. 5b}$$

$$g(s,k) = \left[D + I\left(\frac{T}{4\pi} - \frac{s}{2\pi}\right)\right]\sin(s) \tag{Eq. 5c}$$

$$h(s,k) = -\frac{J}{2} + \frac{kL}{K} \tag{Eq. 5d}$$

for the domain s: [$S_L$, $S_M$] and k: [1, K], where $S_L$ is the angle pertaining to the lateral terminus 522-k and $S_M$ is the angle pertaining to the medial terminus 521-k.

In accordance with the illustrative embodiment, $S_L$=0 radians, $S_M$=8π radians, and K=400.

The location of the longitudinal axis of run of material 201 at the lateral terminus $\vec{r}(S_L, k)$ is given by:

$$f(S_L,k)=70.6 \tag{6a}$$

$$g(S_L,k)=0 \tag{6b}$$

$$h(S_L,k)=0.25k-0.125 \tag{6c}$$

The location of the longitudinal axis of run of material 201 at the medial terminus $\vec{r}(S_M, k)$ is given by:

$$f(S_M,k)=69.4 \tag{7a}$$

$$g(S_M,k)=0 \tag{7b}$$

$$h(S_M,k)=0.25k-0.125 \tag{7c}$$

In accordance with the illustrative embodiment, spiral PS[k] is conjoined with spiral PS[k−1] such that the material in spiral PS[k] at location $$\vec{r}(s,k) \tag{8a}$$

touches and fuses to the material in spiral PS[k−1] at location $$\vec{r}(s,k-1) \tag{8b}$$

for the interval s: [$S_L$, $S_M$] and k: [2, K]. It will be clear to those skilled in the art, after reading this disclosure, how to make and use alternative embodiments of the present invention in which two spirals are conjoined such that their material touches and fuses in different locations.

In accordance with the illustrative embodiment, the respective turns of spiral PS[k] are conjoined such that the material in spiral PS [k] at location $$\vec{r}(s,k) \tag{9a}$$

touches and fuses to the material in the same spiral at location $$\vec{r}(s-2\pi,k) \tag{9b}$$

for the interval t: [SL+2π, SM] and the domain k: [1, K]. It will be clear to those skilled in the art, after reading this disclosure, how to make and use alternative embodiments of the present invention in which the respective turns of a spiral are conjoined such that their material touches and fuses in different locations.

Figure 6:
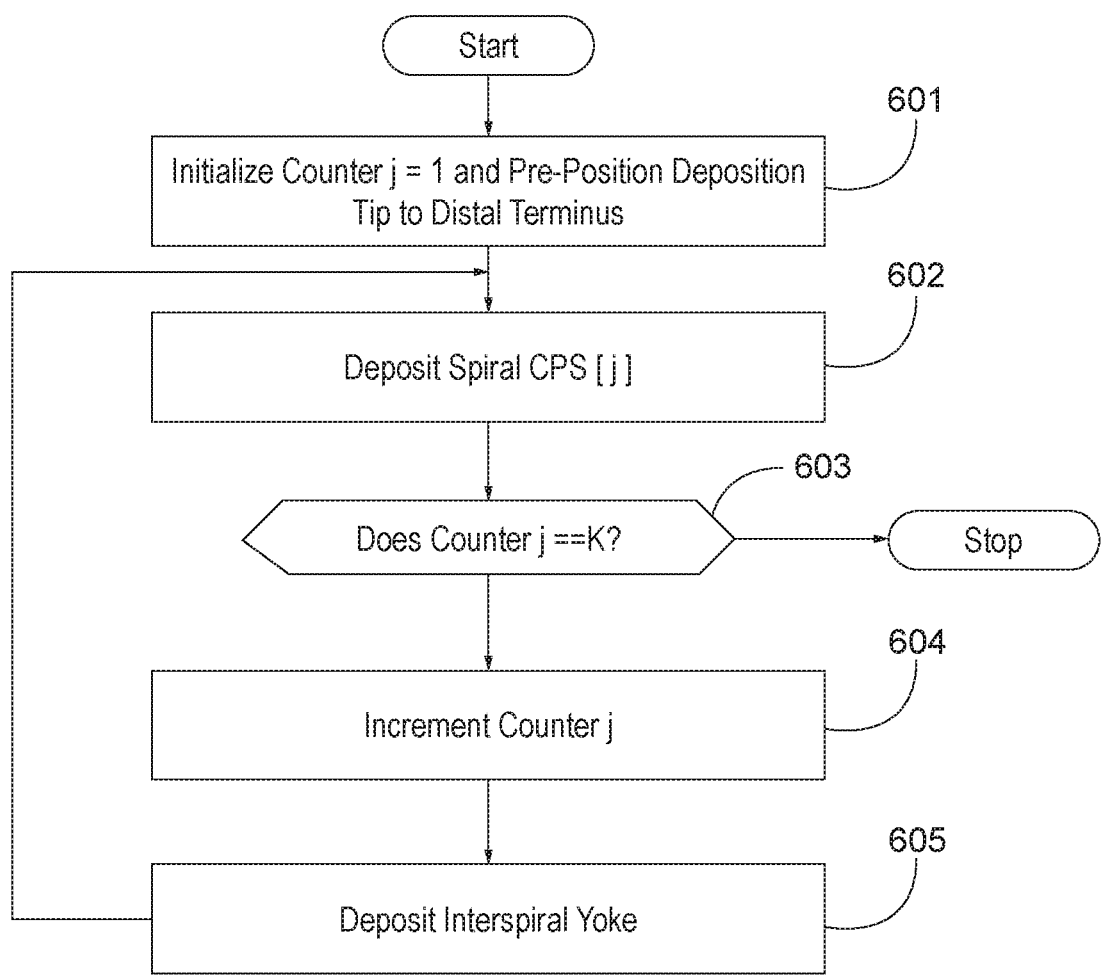
FIG. 6 depicts a flowchart of the process by which duct 500 is manufactured from a single continuous run of material run of material 501 without any discontinuities.

FIG. 6 depicts a flowchart of the process by which duct 500 is manufactured from a single continuous run of material—run of material 501. It will be clear to those skilled in the art, however, how to make and use alternative embodiments of the present invention that are made from a plurality of runs of material. In the process described in FIG. 6, all of the coordinates given relate to the longitudinal axis of run of material 501.

At task 601, a counter j is initialized to one, where j is a positive integer in the range j∈{1, ..., K}, and deposition nozzle 123 is positioned to begin the deposition of run of material 501 at lateral terminus 522-1 which is $\vec{r}(S_L, 1)$.

At task 602, deposition nozzle 123 deposits run of material 501 to form spiral PS[j]. When j is odd, deposition nozzle 123 begins task 602 at lateral terminus 522-j and deposits run of material 501 spirally clockwise 8π radians to medial terminus 521-j (i.e., run of material 501 proceeds from $\vec{r}(S_L, k)$ to $\vec{r}(S_M, k)$ in accordance with equations 5b, 5c, and 5d). In contrast, when j is even, deposition nozzle 123 begins task 602 at medial terminal 521-j and deposits run of material 501 spirally counter-clockwise 8π radians to lateral terminus 522-j (i.e., run of material 501 proceeds from $\vec{r}(S_M, k)$ to $\vec{r}(S_L, k)$ in accordance with equations 5b, 5c, and 5d).

At task 603, the value of the counter j is tested to determine when spiral PS[K] has been deposited (i.e., when j==K). When, indeed spiral PS[K] has been deposited, process 600 stops. In contrast, when spiral PS[K] has not been deposited, control proceeds to task 604.

At task 604, the value of counter j is incremented by one (i.e., j++).

At task 605, deposition nozzle 123 deposits a connection between spiral PS[j−1] and spiral PS[j] that is designated inter-spiral yoke 523-j. When j is odd, deposition nozzle 123 begins task 605 at lateral terminus 522-(j−1) and deposits run of material 501 from lateral terminus 522-(j−1) to lateral terminus 522-j to form inter-spiral yoke 523-j, which is a traversal in the +Z direction of distance J (i.e., run of material 501 proceeds from $\vec{r}(S_L, k+1)$ to $\vec{r}(S_L, k)$).

In accordance with the illustrative embodiment, inter-spiral yoke 523-j is a straight Euclidean shortest-path connection from $\vec{r}(S_L, k-1)$ to $\vec{r}(S_L, k-1)$ but it will be clear to those skilled in the art, after reading this disclosure, how to make and use alternative embodiments of the present invention in which inter-spiral yoke 523-j has any other geometry (e.g., a semicircle, a loop, a helix from $\vec{r}(S_L, k-1)$ to $\vec{r}(S_L, k)$ of greater radius than $\vec{r}(S_L, k-1)$, etc.).

Figure 5H:
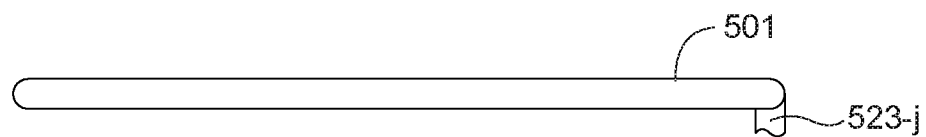
FIG. 5H depicts an illustration of an elevation view of spiral PS[j] and inter-spiral yoke 523-j when j is odd.
Figure 5I:
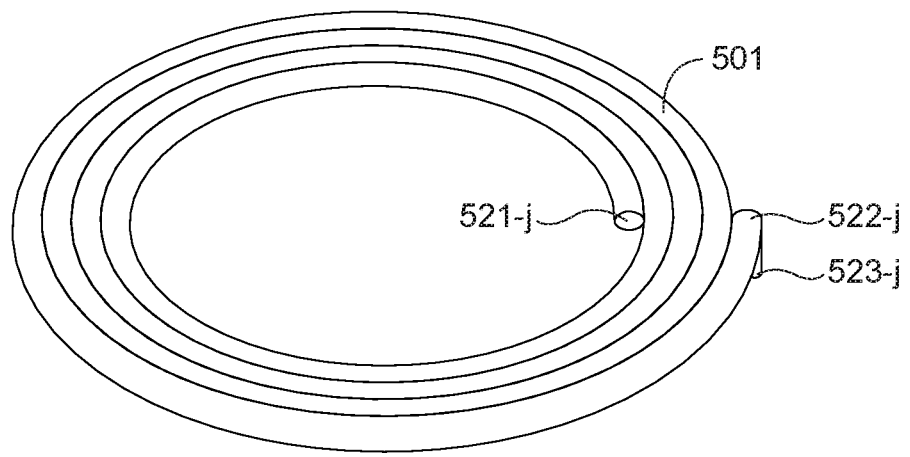
FIG. 5I depicts an illustration of an illustration of a perspective view of spiral PS[j] with inter-spiral yoke 523-j when j is odd.

FIG. 5H depicts an illustration of an elevation view of spiral PS[j] and inter-spiral yoke 523-j when j is odd, and FIG. 5I depicts an illustration of an illustration of a perspective view of spiral PS [j] with inter-spiral yoke 523-j when j is odd.

In contrast, when j is even, deposition nozzle 123 begins task 605 at medial terminus 521-(j−1) and deposits run of material 501 from medial terminus 521-(J−1) to medial terminus 522-j to form inter-spiral yoke 523-j, which is a traversal in the +Z direction of distance J (i.e., run of material 501 proceeds from $\vec{r}(S_M, k-1)$ to $\vec{r}(S_M, k)$).

In accordance with the illustrative embodiment, inter-spiral yoke 523-j is a straight Euclidean shortest-path connection from $\vec{r}(S_M, k-1)$ to $\vec{r}(S_M, k-1)$ but it will be clear to those skilled in the art, after reading this disclosure, how to make and use alternative embodiments of the present invention in which inter-spiral yoke 523-j has any other geometry (e.g., a semicircle, a loop, a helix from $\vec{r}(S_M, k-1)$ to $\vec{r}(S_M, k)$ of less radius than $\vec{r}(S_M, k-1)$, etc.).

Figure 5J:
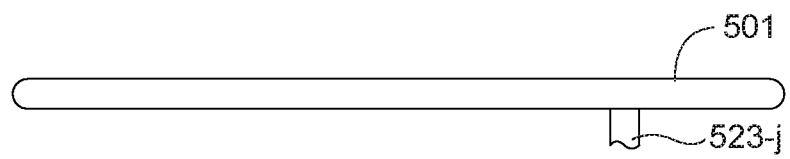
FIG. 5J depicts an illustration of an elevation view of spiral PS[j] with inter-spiral yoke 523-j when j is even.
Figure 5K:
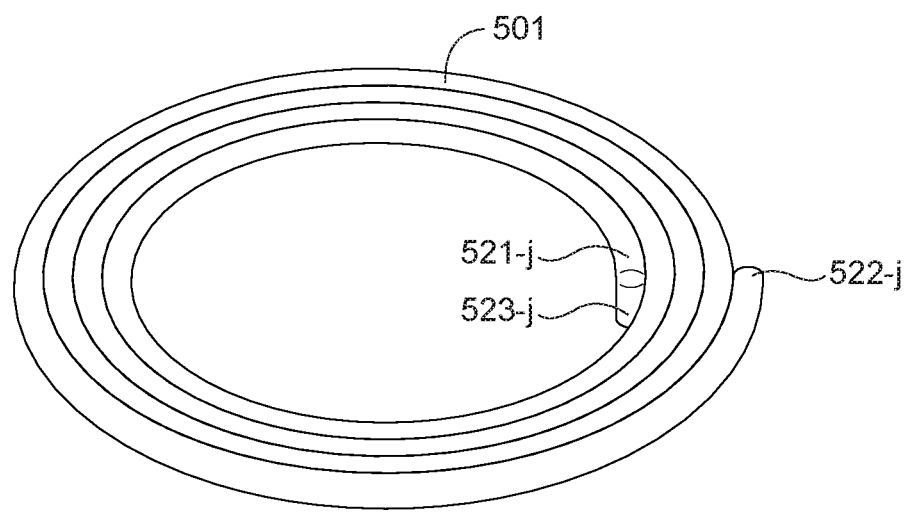
FIG. 5K depicts an illustration of an illustration of a perspective view of spiral PS[j] with inter-spiral yoke 523-j when j is even.

FIG. 5J depicts an illustration of an elevation view of spiral PS[j] with inter-spiral yoke 523-j when j is even, and FIG. 5K depicts an illustration of an illustration of a perspective view of spiral PS[j] with inter-spiral yoke 523-j when j is even.

From task 605, control proceeds to task 602.

Figure 7A:
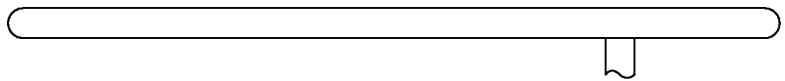
FIG. 7A depicts an illustration of a perspective view of duct 700 in accordance with an alternative embodiment of the present invention.
Figure 7B:
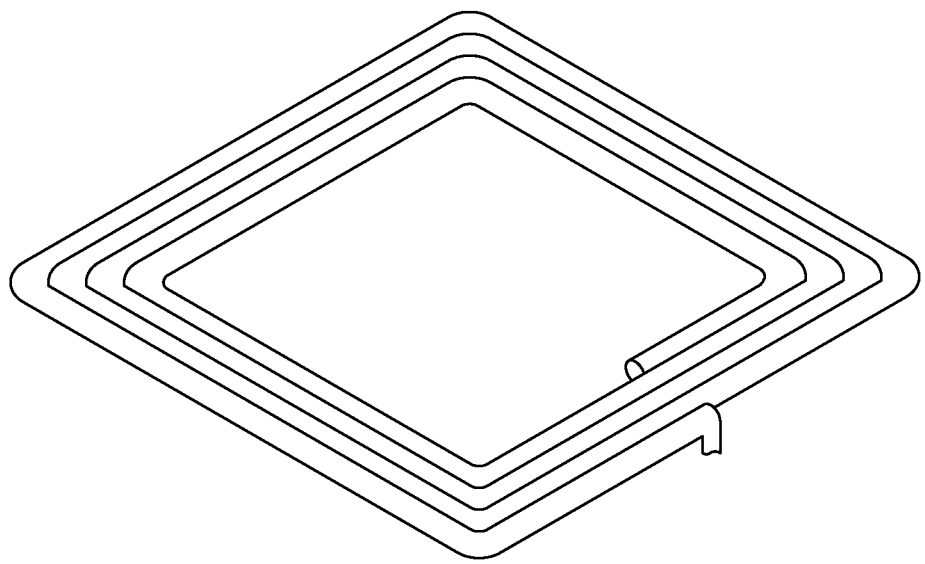
FIG. 7B depicts an elevation view of duct 700.

In FIGS. 5A and 5C it can be seen that duct 500 is circular cylinder (i.e., the radius of duct 500 is isotropic $\vec{d}(t)$ for all t), but will be clear to those skilled in the art, after reading this disclosure, how to make and use a conjoined helical duct in which the radius is anisotropic around $\vec{d}(t)$ for any or all t, and, therefore, provides a duct of shape (e.g., elliptical, rectangular, irregular, etc.). For example, FIG. 7A depicts an elevation view of conjoined rectangular-with-rounded-corners planar spiral 700, which can be used to manufacture a rectangular-with-rounded-corners conjoined helical duct such as that shown in FIGS. 3A, 3B, and 3C. FIG. 7B depicts a perspective view of planar spiral 700. It will be clear to those skilled in the art, after reading this disclosure, how to make and use conjoined rectangular-with-rounded-corners planar spiral 700.

Figure 8A:
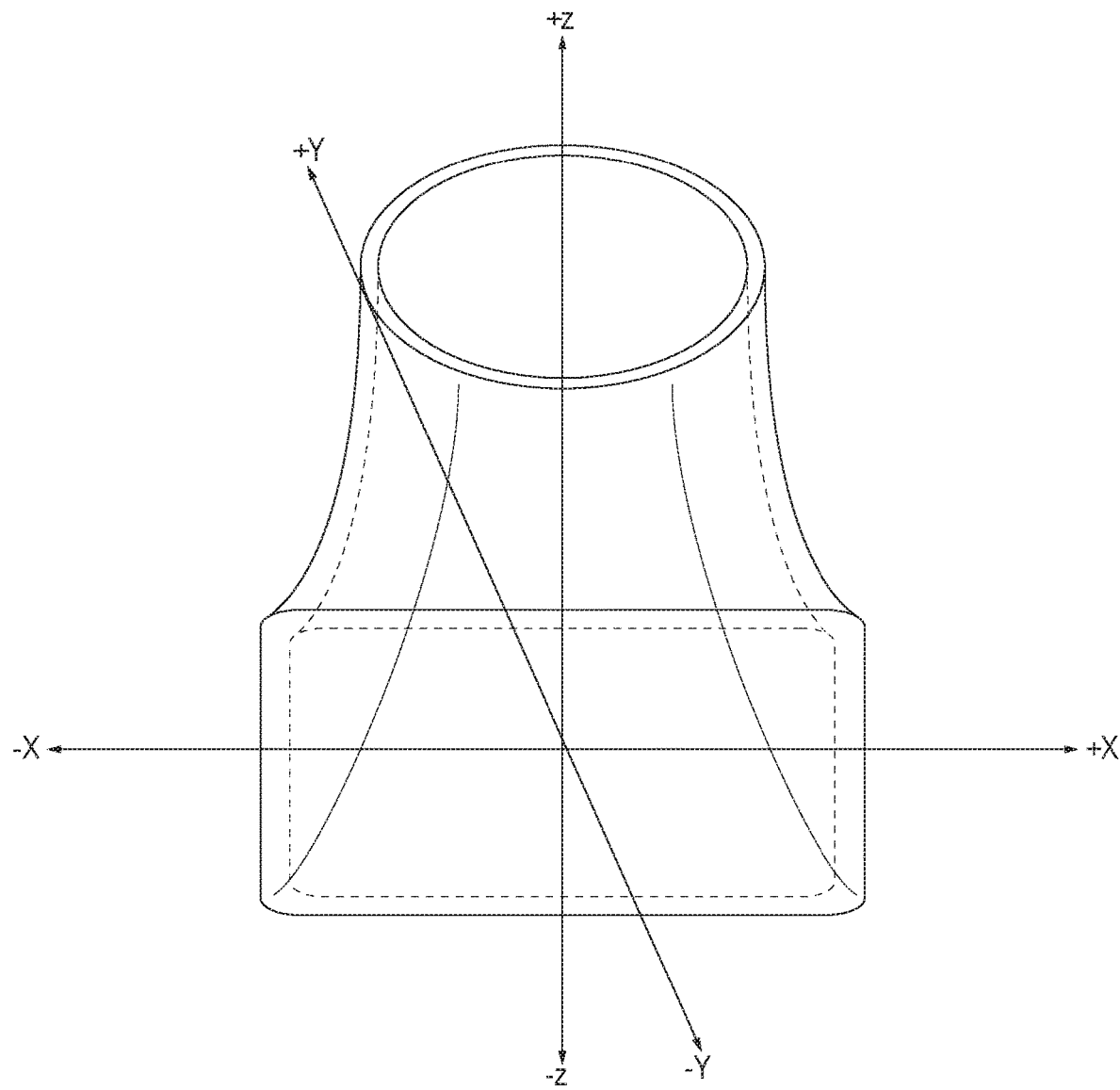
FIG. 8A depicts an illustration of a perspective view of duct 800 in accordance with an alternative embodiment of the present invention.
Figure 8C:
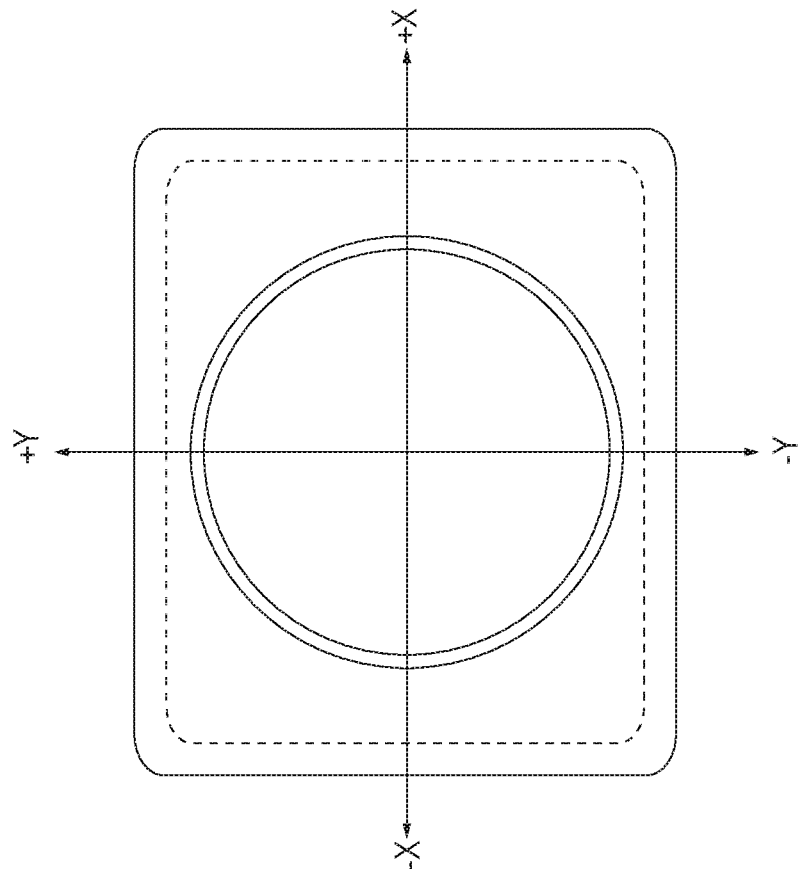
FIG. 8C depicts a plan view of duct 800.
Figure 8B:
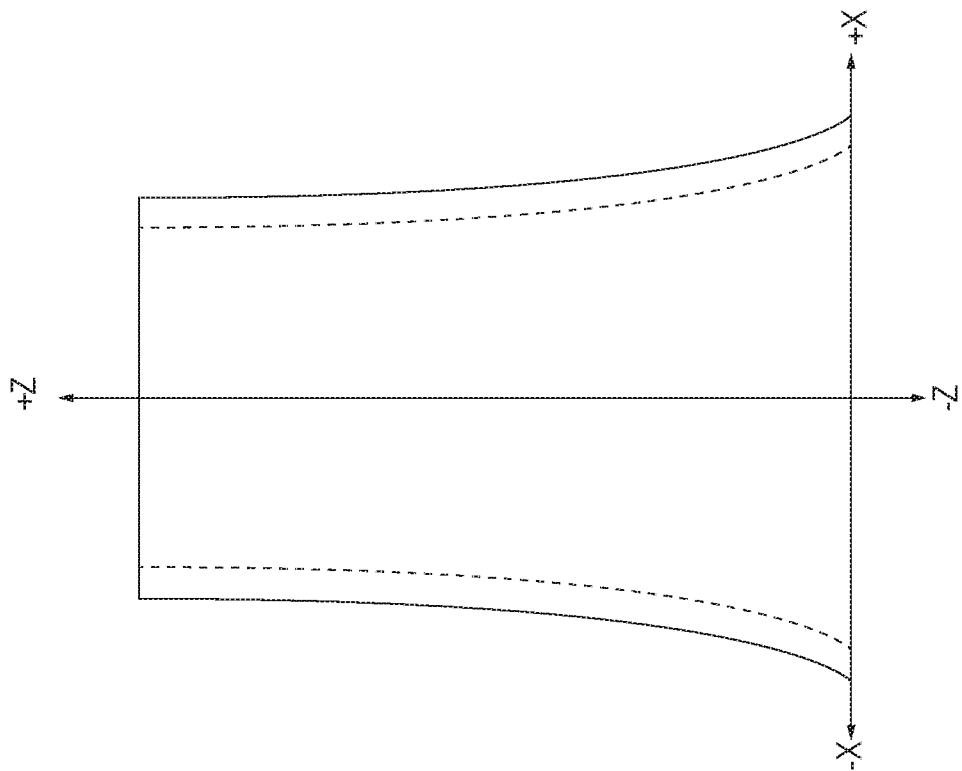
FIG. 8B depicts an elevation view of duct 800.

In FIGS. 5A and 5B it can be seen that duct 500 is a straight cylinder (i.e., the radius of duct 500 is constant), but it will be clear to those skilled in the art, after reading this disclosure, how to make and use alternative embodiments of the present invention in which the radius changes with t. For example, FIG. 8A depicts an illustration of a perspective view of duct 800, which is a conjoined stack of circular-at-one-end-rectangular-with-rounded-corners-at-the-other-end planar spirals duct. FIG. 8B depicts an elevation view of duct 800; FIG. 8C depicts a plan view of duct 800. It will be clear to those skilled in the art, after reading this disclosure, how to make and use duct 800.

Multi-Turn Straight Ducts—Conjoined Stack of Conical Spirals

Figure 9A:
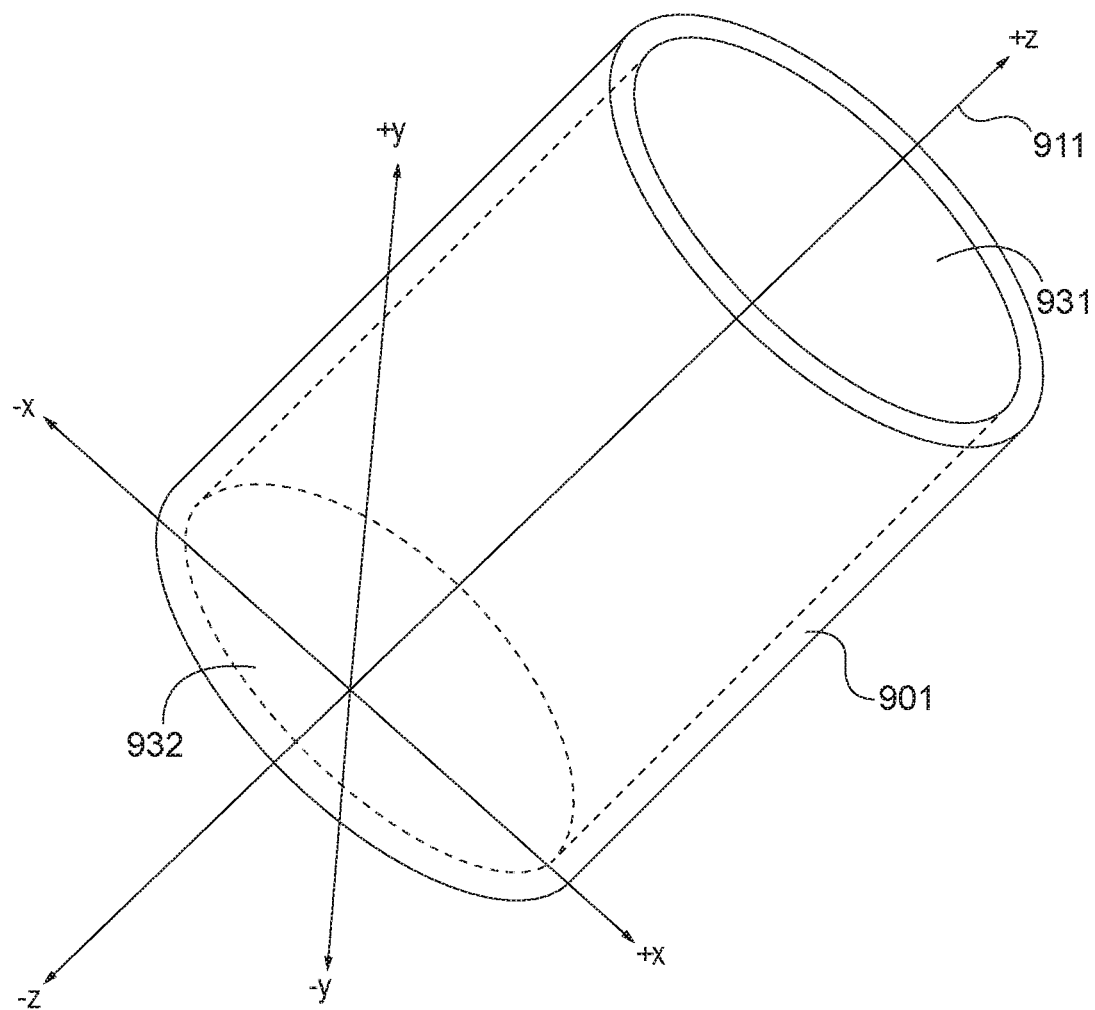
FIG. 9A depicts an illustration of a perspective view of duct 900, which is an illustrative embodiment of the present invention.
Figure 9C:
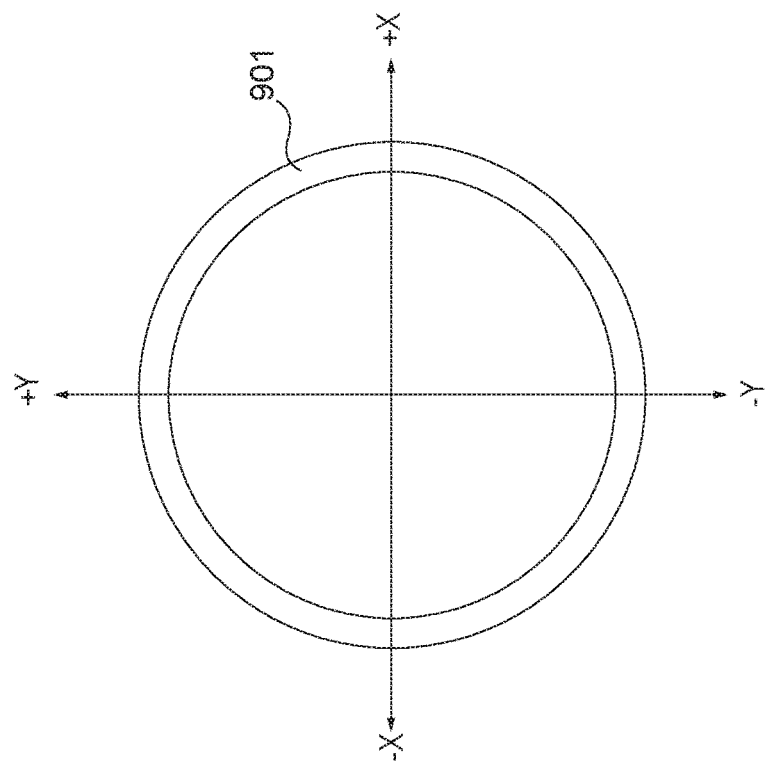
FIG. 9C depicts a plan view of duct 900.
Figure 9B:
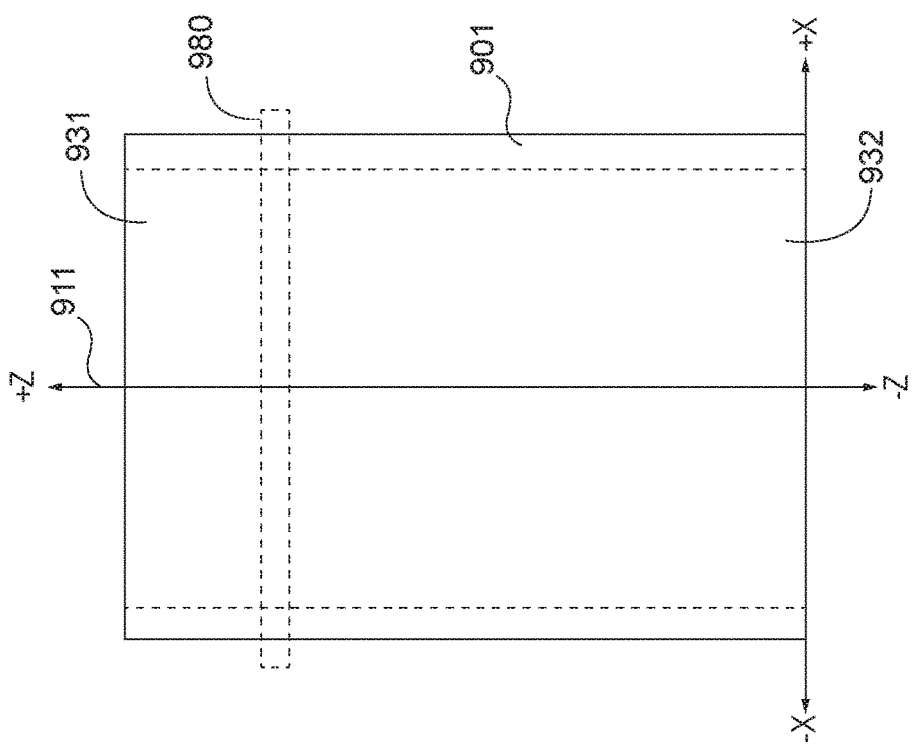
FIG. 9B depicts an elevation view of duct 900.
Figure 9D:
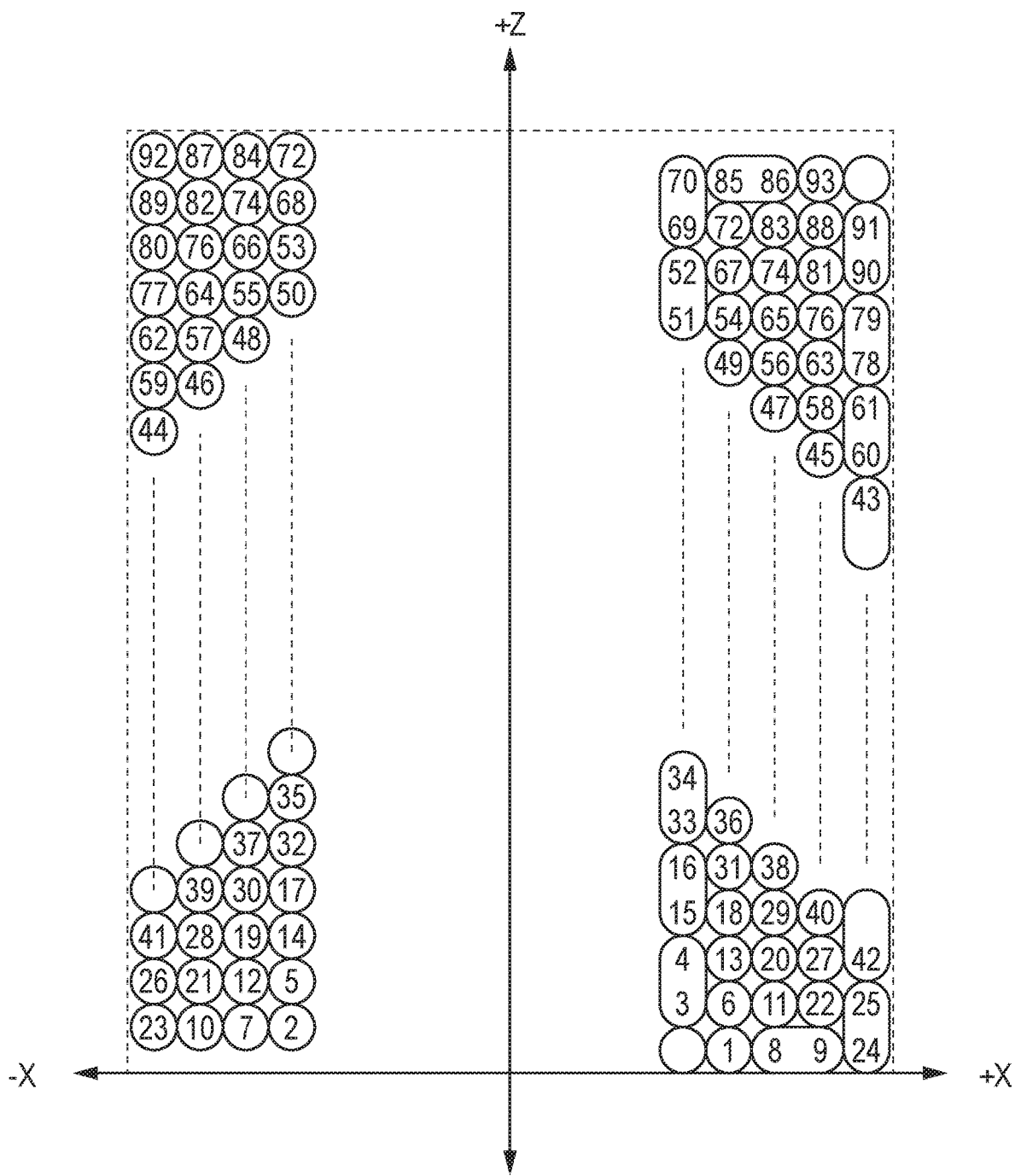
FIG. 9D depicts a cross-section view of duct 900 along the Y=0 X-Z plane enlarged for magnification purposes looking in the +y direction and which indicates the order in which locations in duct 900 are deposited.

FIG. 9A depicts an illustration of a perspective view of duct 900, which is an illustrative embodiment of the present invention. FIG. 9B depicts an elevation view of duct 900, and FIG. 9C depicts a plan view of duct 900. FIG. 9D depicts a cross-section view of duct 900 along the Y=0 X-Z plane enlarged for magnification purposes.

Duct 900 is a straight, multi-turn circular cylindrical duct that is capable of directing the flow of a fluid between opening 931 and opening 932. Duct 900 has a length L of 100 millimeters as measured along duct axis 911. Duct 900 has mean diameter D of 70 millimeters. The wall of duct 900 is 1.2 millimeters thick and comprises four turns of a run of material. It will be clear to those skilled in the art, after reading this disclosure, how to make and use alternative embodiments of the present invention that have of any length, any diameter, and any wall thickness, and any number of turns.

Duct 900 is manufactured by depositing a continuous run of material—run of material 901—in the form of a conjoined stack of conical spirals, each of which is centered around duct axis 911. In the illustrative embodiment, duct axis 911 is the Z-axis. The details of the conjoined stack of conical spirals is described below and in the accompanying figures.

Run of material 901 comprises a continuous tow of carbon fibers that are impregnated with thermoplastic, but it will be clear to those skilled in the art, after reading this disclosure, how to make and use alternative embodiments of the present invention in which run of material 901 comprises a different material.

The measurement of the isolating axis is 0.3 millimeters and the conjoining axis j(t)=J is 0.25 millimeters. It will be clear to those skilled in the art, however, after reading this disclosure, how to make and use alternative embodiments of the present invention in which the isolating axis i(t) is any value and the conjoining axis j(t) is any value.

To simplify the description of the space curve representing run of material 501, the space curve for duct axis 511 is described first, and then the space curve for the longitudinal axis of run of material 901 for all of the conical spirals is described as a function of the space curve for duct axis 911. It will be clear to those skilled in the art, after reading this disclosure, how to make and use alternative embodiments of the present invention that independently describing the space curve of the run of material without reference to the space curve for the duct axis.

The general form of the vector function for the space curve of duct axis 911 is:

$$\vec{d}(t) = \langle a(t), b(t), c(t) \rangle \tag{10a}$$

where t is a real number. It will be clear to those skilled in the art how to represent the space curve of any duct axis using mathematical techniques other than vector functions.

The particular vector function (in Cartesian coordinates) for duct axis 911 is:

$$a(t) = 0 \tag{10b}$$

$$b(t) = 0 \tag{10c}$$

$$c(t) = t \tag{10d}$$

where t is a real number with the domain t: [0, L]. It will be clear to those skilled in the art, after reading this disclosure, how to determine the vector function of any duct axis in any coordinate system.

The general form of the vector function for the space curve that is the longitudinal axis of a run of material is:

$$\vec{r}(s,k) = \langle f(s,k), g(s,k), h(s,k) \rangle \tag{11a}$$

where s is a real number. It will be clear to those skilled in the art how to represent the space curve of the longitudinal axis of a run of material using mathematical techniques other than vector functions.

Duct 900 comprises B partial conjoined conical spirals at the beginning of the deposition of duct 900, M complete conjoined conical spirals, and E partial conjoined conical spirals at the end of the deposition of duct 900, wherein B, M, and E are positive integers whose values are determined as described below. The B+M+E conjoined conical spirals are designated spiral CS[1−B], . . . , CS[k], . . . , CS[K], wherein K is a positive integer than equals M+E, and wherein k is an integer in the range k∈{1-B, . . . , 0, 1, . . . , K}. Spiral CS[1] is deposited first, spiral CS[k+1] is deposited after and on spiral CS [k], and spiral CS[B+M+E] is deposited last.

Figure 9E:
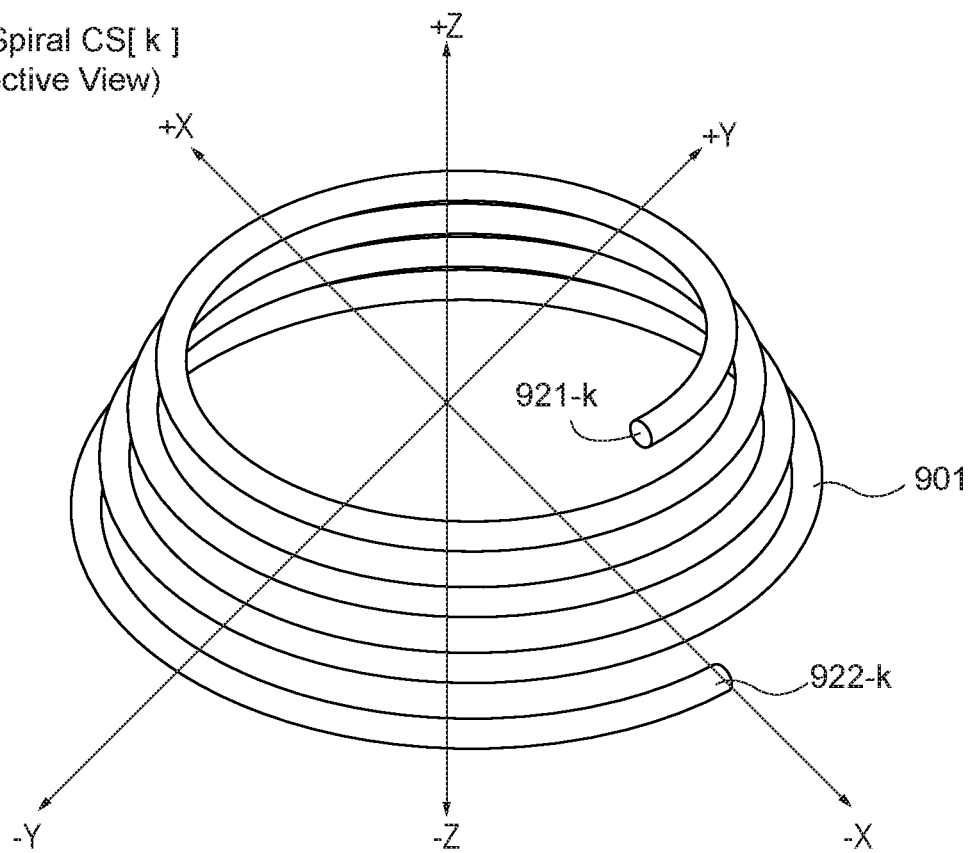
FIG. 9E depicts an illustration of an illustration of a perspective view of spiral CS [k].
Figure 9F:
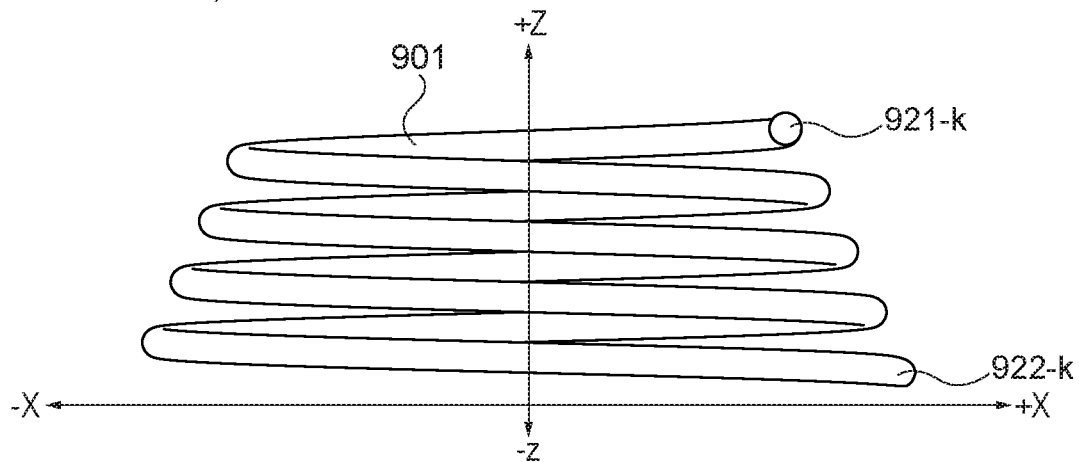
FIG. 9F depicts an illustration of an elevation view of spiral CS[k].
Figure 9G:
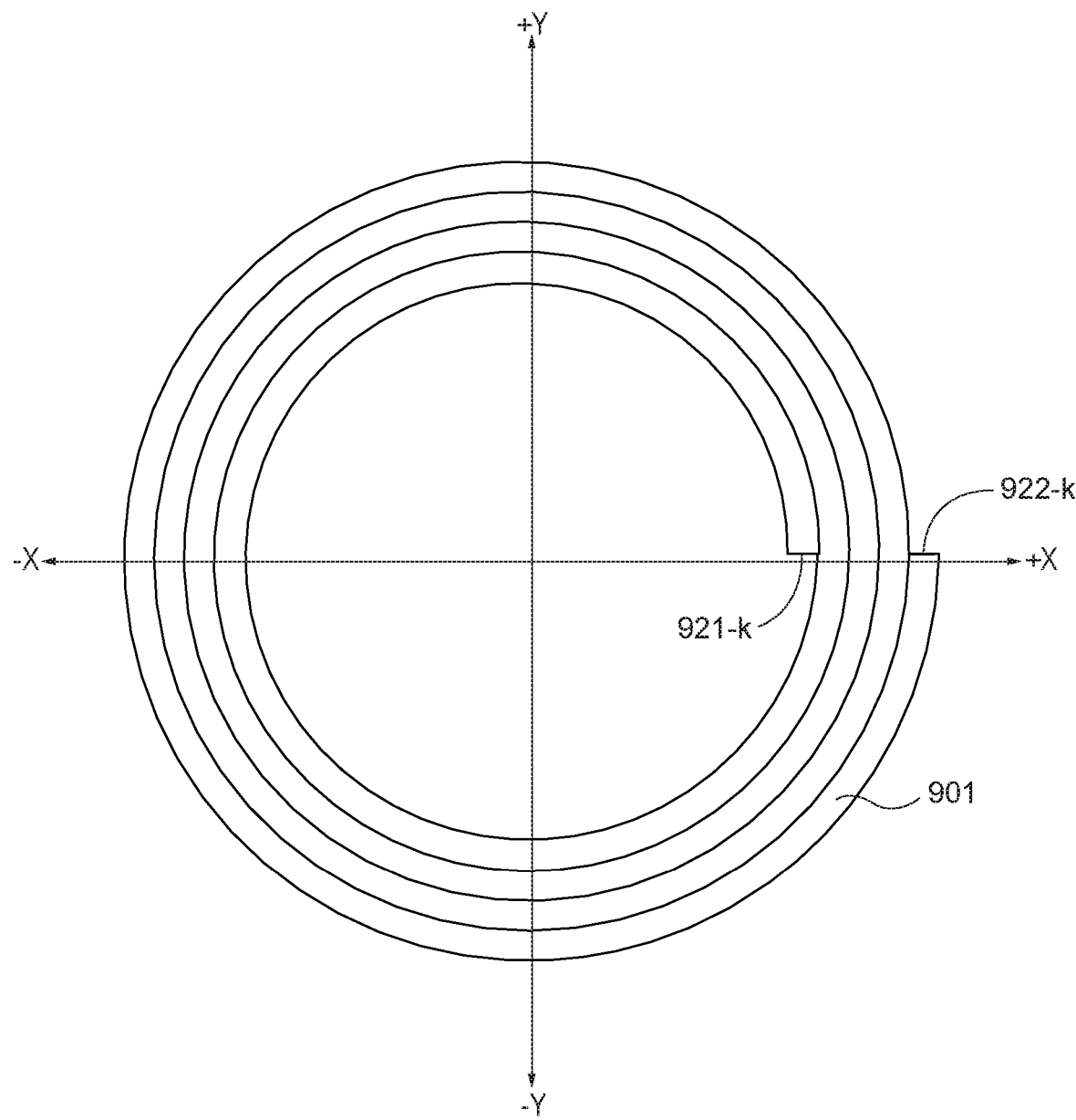
FIG. 9G depicts an illustration of a plan view of spiral CS[k].
Figure 9H:
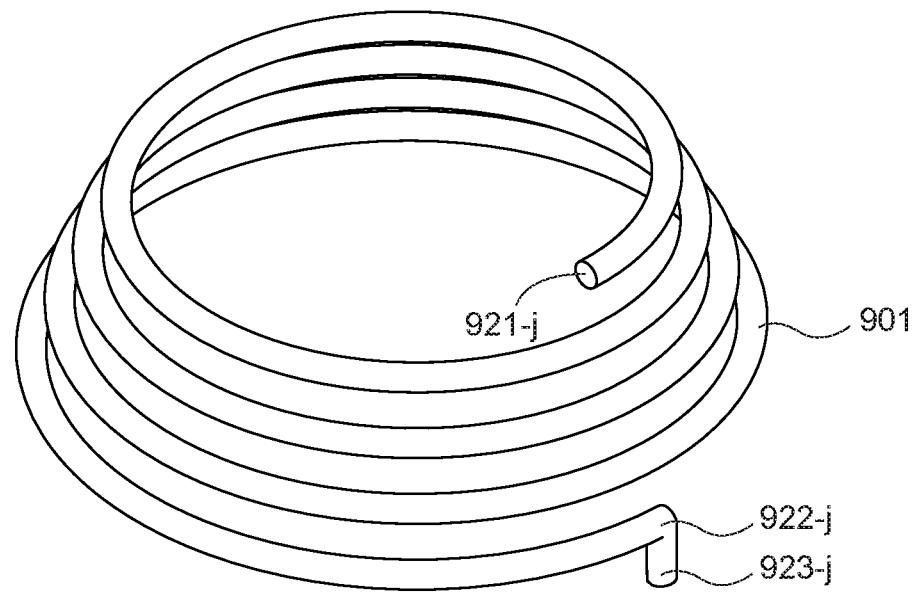
FIG. 9H depicts an illustration of a perspective view of spiral CS[j] for odd j.
Figure 9I:
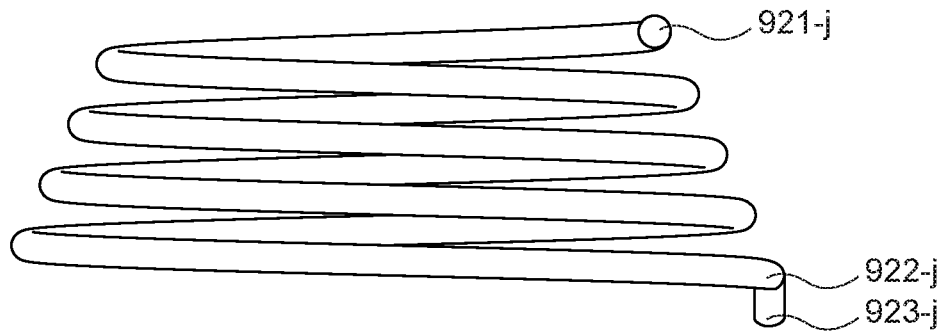
FIG. 9I depicts an illustration of a elevation view of spiral CS[j] for odd j.
Figure 9J:
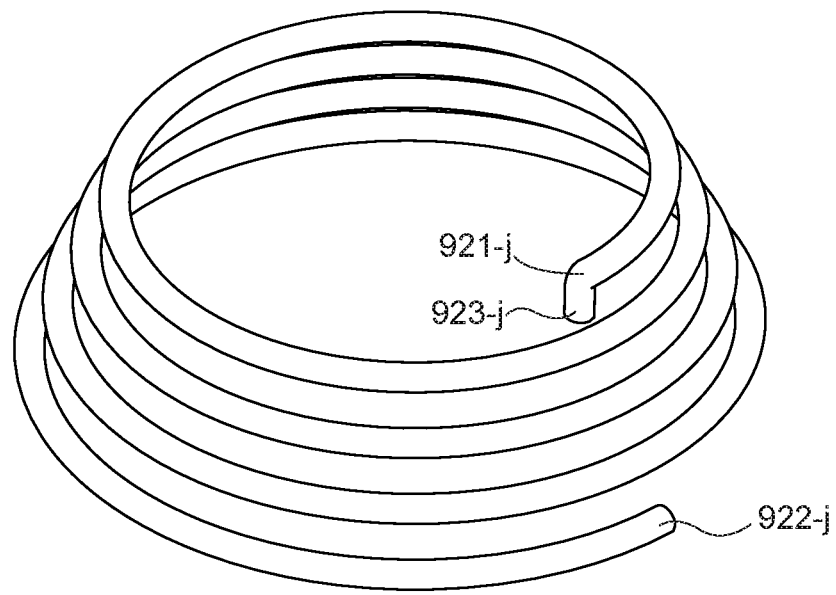
FIG. 9J depicts an illustration of a perspective view of spiral CS[j] for even j.
Figure 9K:
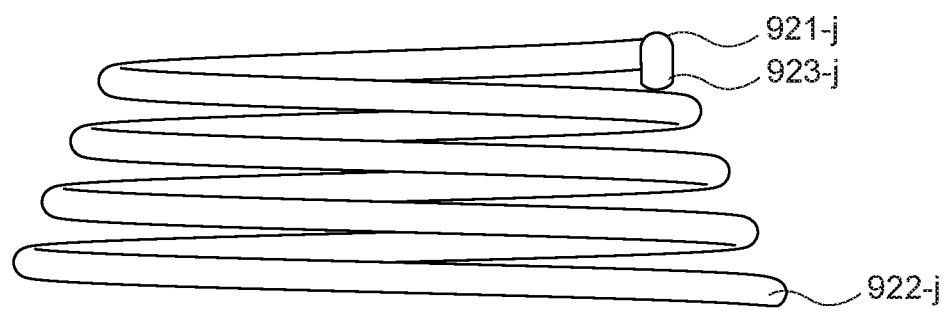
FIG. 9K depicts an illustration of a elevation view of spiral CS[j] for even j.

FIG. 9E depicts an illustration of an illustration of a perspective view of spiral CS [k]. FIG. 9F depicts an illustration of an elevation view of spiral CS[k], and FIG. 9G depicts an illustration of a plan view of spiral CS [k].

Spiral CS[k] comprises a medial terminus 921-*k*, a lateral terminus 922-*k*, and T=8π radians (i.e., four integral turns) of run of material 901 between medial terminus 921-*k* and lateral terminus 922-*k*. It will be clear to those skilled in the art, after reading this disclosure, how to make and use alternative embodiments of the present invention in which T has any value (e.g., on the order of 10's of complete turns, on the order of 100's of complete turns, on the order of 1000's of complete turns, etc.).

In accordance with the illustrative embodiment, spiral CS[k] comprises an integral number of full turns, but it will be clear to those skilled in the art, after reading this disclosure, how to make and use alternative embodiments of the present invention in which the conical spirals comprise fractional turns.

In accordance with the illustrative embodiment, the value of B equals:

$$B = \frac{T}{2\pi} - 1 = \frac{8\pi}{2\pi} - 1 = 3 \tag{Eq. 12a}$$

In accordance with the illustrative embodiment, the value of B equals:

$$E = \frac{T}{2\pi} - 1 = \frac{8\pi}{2\pi} - 1 = 3 \tag{Eq. 12b}$$

The location of the longitudinal axis of run of material 201 (in the context of duct axis 511) is given by the vector function (in Cartesian coordinates)

$$f(s,k) = \left[D + I\left(\frac{T}{4\pi} - \frac{s}{2\pi}\right)\right]\cos(s) + a(s) \tag{Eq. 11b}$$

$$g(s,k) = \left[D + I\left(\frac{T}{4\pi} - \frac{s}{2\pi}\right)\right]\sin(s) + b(s) \tag{Eq. 11c}$$

$$h(s,k) = J\left(\frac{s}{2\pi} + k - \frac{1}{2}\right) + c(0) \tag{Eq. 11d}$$

for the domain k: [1-B, K], where $S_L$ is the angle pertaining to the lateral terminus 922-*k* and $S_M$ is the angle pertaining to the medial terminus 921-*k*. In accordance with the illustrative embodiment, $S_L$=0 radians, $S_M$=8π radians, and K=400. It will be clear to those skilled in the art, after reading this disclosure, how to determine the vector function that describes the shape of any conjoined spiral in any coordinate system.

The location of the longitudinal axis of run of material 901 at the medial terminus $\vec{r}(S_M, k)$ is given by:

$$f(S_M, k) = 69.4 \text{ mm.} \tag{13a}$$

$$g(S_M, k) = 0 \text{ mm.} \tag{13b}$$

$$h(S_M, k) = 0.25k + 0.875 \text{ mm.} \tag{13c}$$

The location of the longitudinal axis of run of material 901 at the lateral terminus $\vec{r}(S_L, k)$ is given by:

$$f(S_L, k) = 70.6 \text{ mm.} \tag{14a}$$

$$g(S_L, k) = 0 \text{ mm.} \tag{13b}$$

$$h(S_L, k) = 0.25k - 0.125 \text{ mm.} \tag{14c}$$

In accordance with the illustrative embodiment, spiral CS[k] and spiral CS[k−1] are conjoined such that the material in spiral CS[k] at location $$\vec{r}(s,k) \quad (15a)$$

touches and fuses to the material in spiral PS[k−1] at two locations:

$$\vec{r}(s,k-1) \quad (15b)$$

for the interval t: [0, 8π] and k: [2, K], and also at location $$\vec{r}(s-2\pi,k) \quad (15c)$$

for the interval t: [0, 6π] and k: [1, K]. It will be clear to those skilled in the art, after reading this disclosure, how to make and use alternative embodiments of the present invention in which two spirals are conjoined such that their material touches and fuses in different locations.

Figure 10:
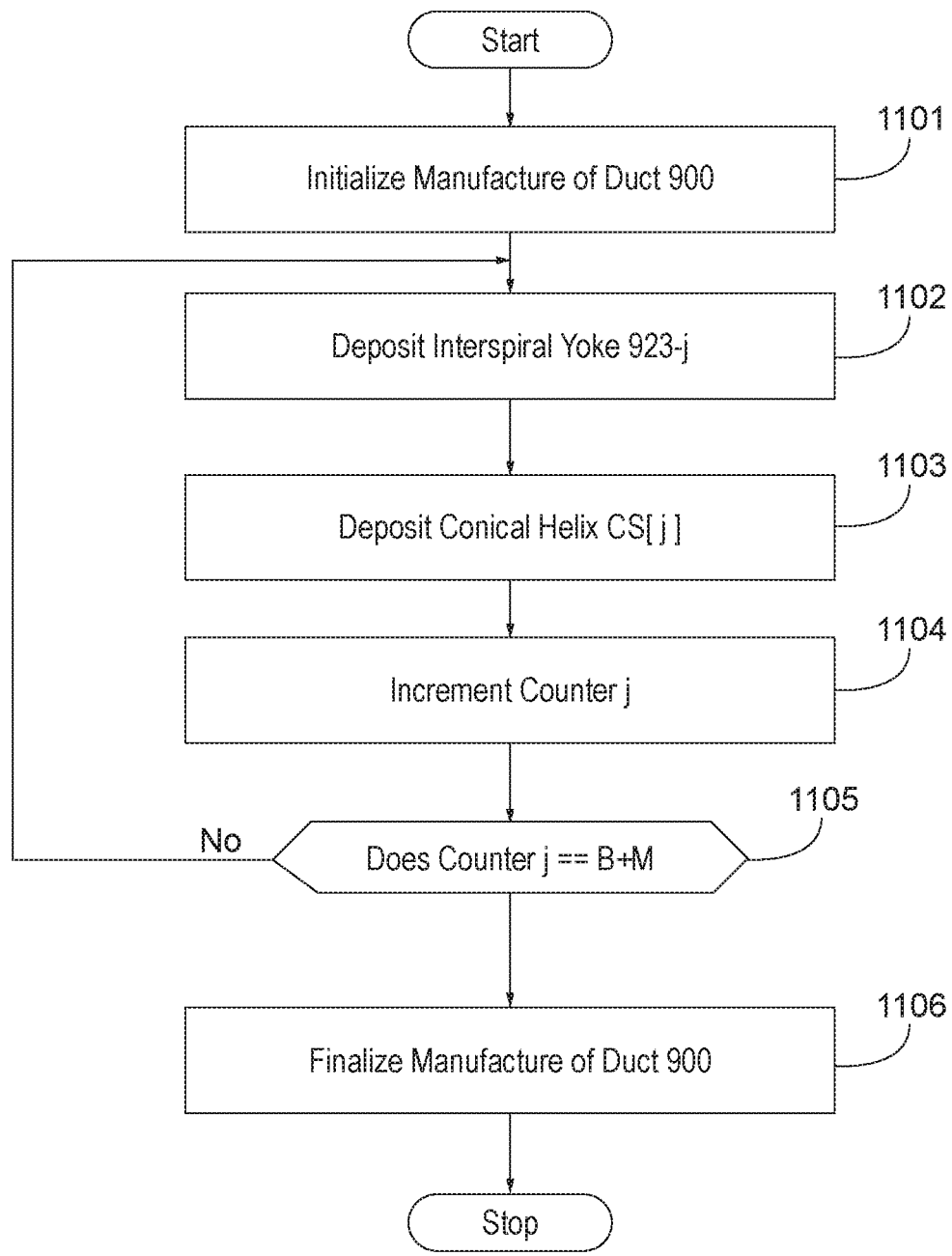
FIG. 10 depicts a flowchart of the process by which duct 900 is manufactured from a single continuous run of material—run of material 901.

FIG. 10 depicts a flowchart of the process by which duct 900 is manufactured from a single continuous run of material run of material 901. It will be clear to those skilled in the art, however, how to make and use alternative embodiments of the present invention that are made from a plurality of discontinuous runs of material.

As an overview, in task 1001, the manufacture of duct 900 is initialized, which includes the deposition of the first B (partial conical spirals CS[1-B] through CS[0]. In tasks 1002 through 1005, manufacture of duct 900 continues with the deposition of the M (complete) conical spirals CS[1] through CS[M]. In task 1006, manufacture of duct 900 concludes with the deposition of the E (partial) conical spirals CS[K-E+1] through CS[K].

At task 1001, the manufacture of duct 900 is initialized. Task 1001 comprises the creation/deposition/insertion of a scaffold, which simplifies the task of manufacturing duct 900, and the deposition of the first B partial conical spirals. Task 1001 is described in detail below and in the accompanying figures.

At task 1002, the deposition of run of material 901 continues with the creation of inter-spiral yoke 923-j. When j is odd, the deposition of run of material 901 continues from $\vec{r}(S_L, j-1)$ to $\vec{r}(S_L, j)$. In accordance with the illustrative embodiment, inter-spiral yoke 923-j is a straight Euclidean shortest-path connection from $\vec{r}(S_L, j-1)$ to $\vec{r}(S_L, j)$ but it will be clear to those skilled in the art, after reading this disclosure, how to make and use alternative embodiments of the present invention in which inter-spiral yoke 923-j has any other geometry (e.g., a semicircle, a loop, a helix from $\vec{r}(S_L, j-1)$ to $\vec{r}(S_L, j)$ of greater radius than $\vec{r}(S_L, j-1)$, etc.).

In contrast, when j is even, the deposition of run of material 901 continues from $\vec{r}(S_M, j-1)$ to $\vec{r}(S_M, j)$. In accordance with the illustrative embodiment, inter-spiral yoke 923-j is a straight Euclidean shortest-path connection from $\vec{r}(S_M,j-1)$ to $\vec{r}(S_M, j)$ but it will be clear to those skilled in the art, after reading this disclosure, how to make and use alternative embodiments of the present invention in which inter-spiral yoke 923-j has any other geometry (e.g., a semicircle, a loop, a helix from $\vec{r}(S_M, j-1)$ to $\vec{r}(S_M,j)$ of less radius than $\vec{r}(S_M, j-1)$, etc.).

At task 1003, the deposition of run of material 901 continues with the creation of spiral CS[j]. When j is even, the deposition of spiral CS[j] begins at $\vec{r}(S_M, j)$ and proceeds counter-clockwise 8π radians through $\vec{r}(7\pi, j)$, $\vec{r}(6\pi, j)$, $\vec{r}(5\pi, j)$, $\vec{r}(4\pi, j)$, $\vec{r}(3\pi, j)$, $\vec{r}(2\pi, j)$, $\vec{r}(1\pi, j)$ and ends at $\vec{r}(S_L, j)$. An example is the progression from Position 16 through Positions 17, 18, 19, 20, 21, 23, 23, and ending at Position 24 in FIG. 9D.

In contrast, when j is odd, the deposition of spiral CS[j] begins at $\vec{r}(S_L, j)$ and proceeds clockwise 8π radians through $\vec{r}(1\pi, j)$, $\vec{r}(2\pi, j)$, $\vec{r}(3\pi, j)$, $\vec{r}(4\pi, j)$, $\vec{r}(5\pi, j)$, $\vec{r}(6\pi, j)$, $\vec{r}(7\pi, j)$, and ends at $\vec{r}(S_M, j)$. An example is the progression from Position 61 through Positions 62, 63, 64, 65, 66, 67, 68, and ending at Position 69 in FIG. 9D.

At task 1004, the value of counter j is incremented by one (i.e., j++).

At task 1005, the value of the counter j is tested to determine whether spiral CS [j] is the last complete conical spiral to be deposited (i.e., when j=B+M+1). When spiral CS[j] is the last complete conical spiral, control passes to task 1006; otherwise control passes to task 1002.

At task 1006, the stack of spirals in duct 900 is finalized with the deposition of the final E conical spirals. Task 1006 is described in detail below and in the accompanying figures.

Figure 11:
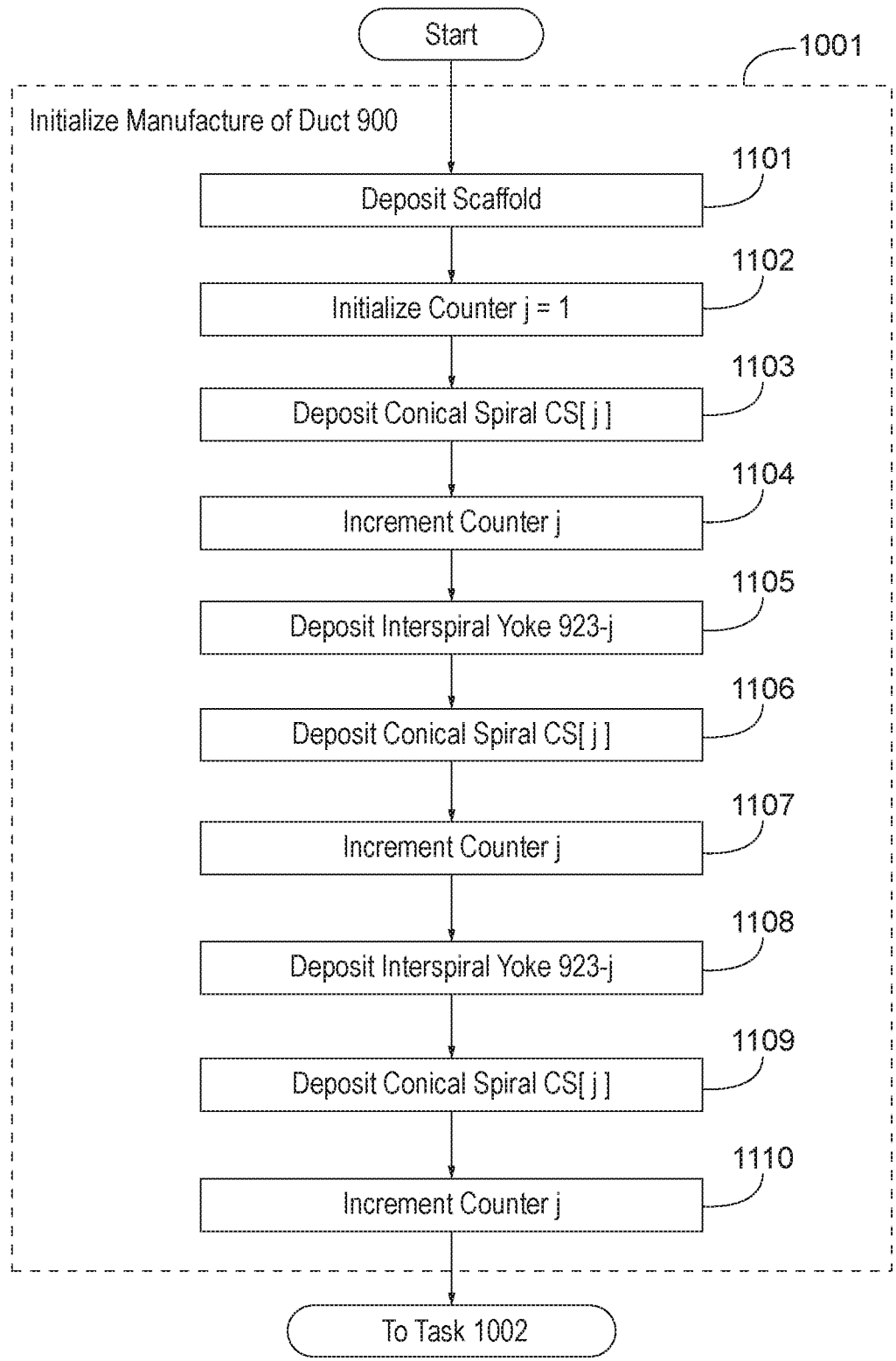
FIG. 11 depicts a flowchart of the salient subtasks associated with task 1001—initializing the manufacture of duct 900.

FIG. 11 depicts a flowchart of the salient subtasks associated with task 1001—initializing the manufacture of duct 900.

At task 1101, the manufacture of duct 900 is simplified by the creation/deposition/insertion of a scaffold onto which duct 900 is deposited. In accordance with the illustrative embodiment, the scaffold is not removed after the deposition of duct 900, but it will be clear to those skilled in the art, after reading this disclosure, how to make and use alternative embodiments of the present invention in which the scaffold is removed after the manufacture of duct 900 is complete.

In accordance with the illustrative embodiment, the scaffold comprises two portions. The dimensions of the first portion of the scaffold are (in cylindrical coordinates):

$$D - l\frac{T}{4\pi}\text{mm.} \le r \le D + l\frac{T}{4\pi}\text{mm.} \quad (\text{Eq. 16a})$$

$$0 \text{ radians} \le \theta \le 2\pi \text{ radians} \quad (\text{Eq. 16b})$$

$$0 \text{ mm.} \le z \le J\frac{(1-\cos\theta)}{4}\text{mm.} \quad (\text{Eq. 16c})$$

The dimensions of the second portion of the scaffold are (in cylindrical coordinates):

$$D - \frac{3l}{2}\text{mm.} \le r \le D - \frac{5l}{2}\text{mm.} \quad (\text{Eq. 17a})$$

$$\pi \text{ radians} \le \theta \le 2\pi \text{ radians} \quad (\text{Eq. 17b})$$

$$z = J\frac{\theta}{2\pi}\text{mm.} \quad (\text{Eq. 17c})$$

At task 1102, a counter j is initialized to 1-B (i.e., −2).

At task 1103, the deposition of run of material 901 begins with the creation of (a portion of) spiral CS[j]. In particular, the deposition of run of material 901 begins at $\vec{r}(6\pi,j)$ (Position 1 in FIG. 9D) and proceeds counter-clockwise 2π radians to $\vec{r}(7\pi, j)$ (Position 2 in FIG. 9D) and ends at $\vec{r}(S_M, j)$ (Position 3 in FIG. 9D), which is medial terminus 921-j.

At task 1104, the value of counter j is incremented by one (i.e., to −1).

At task 1105, the deposition of run of material 901 continues with the creation of inter-spiral yoke 923-*j*. In particular, the deposition of inter-spiral yoke 923-*j* begins at $\vec{r}(S_M, j-1)$ (Position 3 in FIG. 9D) and proceeds in the +Z direction to $\vec{r}(S_M, j)$ (Position 4 in FIG. 9D), which is medial terminus 921-*j*.

At task 1106, the deposition of run of material 901 continues with the creation of (a portion of) spiral CS[j]. In particular, the deposition of spiral CS[j] begins at $\vec{r}(S_M, j)$ (Position 4 in FIG. 9D) and proceeds clockwise 4π radians to $\vec{r}(7\pi, j)$ (Position 5 in FIG. 9D), then to $\vec{r}(6\pi, j)$ (Position 6 in FIG. 9D), then to $\vec{r}(5\pi, j)$ (Position 7 in FIG. 9D) and ends at $\vec{r}(4\pi, j)$ (Position 8 in FIG. 9D).

At task 1107, the value of counter j is incremented by one (i.e., to 0).

At task 1108, the deposition of run of material 901 continues with the creation of inter-spiral yoke 923-*j*. In particular, the deposition of inter-spiral yoke 923-*j* begins at $\vec{r}(4\pi, j)$ (Position 8 in FIG. 9D) and proceeds in the +X direction to $\vec{r}(2\pi, j)$ (Position 9 in FIG. 9D).

At task 1109, the deposition of run of material 901 continues with the creation of (a portion of) spiral CS [j]. In particular, the deposition of spiral CS[j] begins at $\vec{r}(2\pi, j)$ (Position 9 in FIG. 9D) and proceeds counter-clockwise 6π radians to $\vec{r}(3\pi, j)$ (Position 10 in FIG. 9D), then to $\vec{r}(4\pi, j)$ (Position 11 in FIG. 9D), then to $\vec{r}(5\pi, j)$ (Position 12 in FIG. 9D), then to $\vec{r}(6\pi, j)$ (Position 13 in FIG. 9D), then to $\vec{r}(7\pi, j)$ (Position 14 in FIG. 9D), and ends at $\vec{r}(S_M, j)$ (Position 15 in FIG. 9D). At the completion of task 1109, the initialization of the manufacture of duct 900 is complete.

At task 1110, the value of counter j is incremented by one (to 1). From task 1110, control passes to task 1002.

Figure 12:
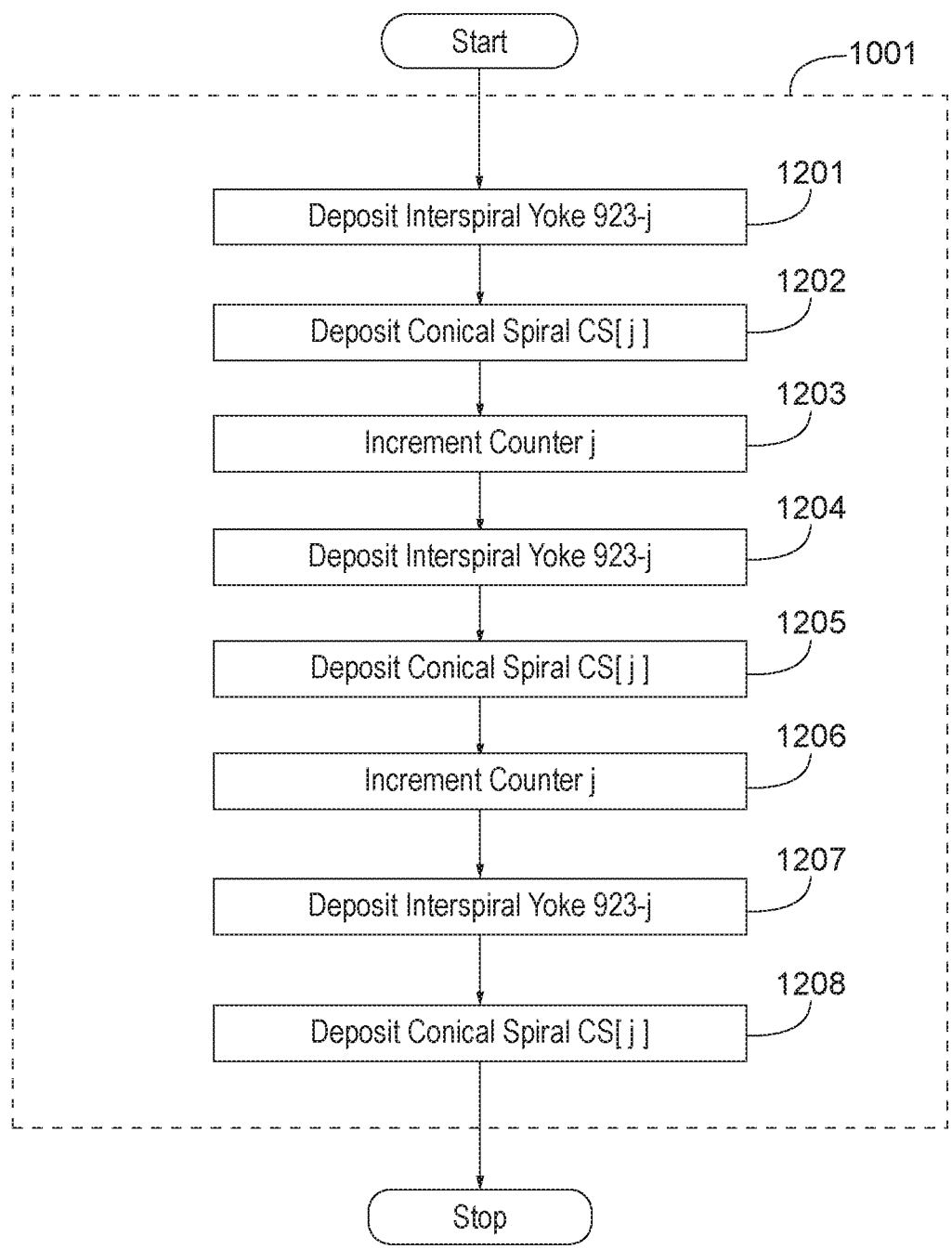
FIG. 12 depicts a flowchart of the salient subtasks associated with task 1008—finalizing the manufacture of duct 900.

FIG. 12 depicts a flowchart of the salient subtasks associated with task 1008—finalizing the manufacture of duct 900.

At task 1201, the deposition of run of material 901 continues with the creation of inter-spiral yoke 923-*j*. In particular, the deposition of run of material 901 continues from $\vec{r}(S_L, j-1)$ (Position 78 in FIG. 9D) to $\vec{r}(S_L, j)$ (Position 79 in FIG. 9D).

At task 1202, the deposition of run of material 901 continues with the creation of (a portion of) spiral C[j]. In particular, the deposition of spiral CS[j] begins at $\vec{r}(S_L, j)$ (Position 79 in FIG. 9D) and proceeds counter-clockwise 6π radians to $\vec{r}(1\pi, j)$ (Position 80 in FIG. 9D), then to $\vec{r}(2\pi, j)$ (Position 81 in FIG. 9D), then to $\vec{r}(3\pi, j)$ (Position 83 in FIG. 9D), then to $\vec{r}(4\pi, j)$ (Position 83 in FIG. 9D), then to $\vec{r}(5\pi, j)$ (Position 84 in FIG. 9D) and ends at $\vec{r}(6\pi, j)$ (Position 85 in FIG. 9D).

At task 1203, the value of counter j is incremented by one (i.e., to B+M+2).

At task 1204, the deposition of run of material 901 continues with the creation of inter-spiral yoke 923-*j*. In particular, the deposition of run of material 901 continues in the +X direction from $\vec{r}(6\pi, j-1)$ (Position 85 in FIG. 9D) to $\vec{r}(4\pi, j)$ (Position 86 in FIG. 9D).

At task 1205, the deposition of run of material 901 continues with the creation of (a portion of) spiral CS [j]. In particular, the deposition of spiral CS[j] begins at $\vec{r}(4\pi, j)$ (Position 86 in FIG. 9D) and proceeds clockwise 4π radians to $\vec{r}(3\pi, j)$ (Position 87 in FIG. 9D), then to $\vec{r}(2\pi, j)$ (Position 88 in FIG. 9D), then to $\vec{r}(1\pi, j)$ (Position 89 in FIG. 9D), and ends at $\vec{r}(S_M, j)$ (Position 90 in FIG. 9D)

At task 1206, the value of counter j is incremented by one (i.e., to B+M+3).

At task 1207, the deposition of run of material 901 continues with the creation of inter-spiral yoke 923-*j* from lateral terminus 922-(*j*−1) to lateral terminus 922-*j*, which is a traversal in the +Z direction of J millimeters. In particular, the deposition of run of material 901 continues in the +Z direction from $\vec{r}(S_L, j-1)$ (Position 90 in FIG. 9D) to $\vec{r}(S_L, j)$ (Position 91 in FIG. 9D).

At task 1208, the deposition of run of material 901 continues with the creation of (a portion of) spiral CS [j]. In particular, the deposition of spiral CS[j] begins at $\vec{r}(S_L, j)$ (Position 91 in FIG. 9D) and proceeds counter-clockwise 2π radians to $\vec{r}(1\pi, j)$ (Position 92 in FIG. 9D), and ends at $\vec{r}(2\pi, j)$ (Position 93 in FIG. 9D). At the end of task 1208, the deposition of run of material 901 stops and duct 900 is complete.

In FIGS. 9A and 9C it can be seen that duct 900 is a circular cylinder (i.e., the radius of duct 900 is isotropic $\vec{d}(t)$ for all t), but will be clear to those skilled in the art, after reading this disclosure, how to make and use a conjoined helical duct in which the radius is anisotropic around $\vec{d}(t)$ for any or all t, and, therefore, provides a duct of shape (e.g., elliptical, rectangular, irregular, etc.). For example, it will be clear to those skilled in the art, after reading this disclosure, how to manufacture a conjoined stack of rectangular-with-rounded-corner-conical-spirals duct (with similar dimensions as the duct depicted in FIGS. 3A, 3B, and 3C).

In FIGS. 9A and 9B it can be seen that duct 900 is a straight cylinder (i.e., the radius of duct 900 is constant), but it will be clear to those skilled in the art, after reading this disclosure, how to make and use alternative embodiments of the present invention in which the radius changes with t. For example, it will be clear to those skilled in the art, after reading this disclosure, how to manufacture a conjoined stack of circular-at one-end-rectangular-with-rounded-corners-at-the-other-end-conjoined-spirals duct (with similar dimensions as the duct depicted in FIGS. 8A, 8B, and 8C).

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:
1. An article of manufacture comprising:
   a first spiral of a run of material that comprises a medial terminus and a lateral terminus, wherein the first spiral is a conical spiral;
   a second spiral of the run of material that comprises a medial terminus and a lateral terminus; and
   a first inter-spiral yoke of the run of material connected at a first position to the medial terminus of the first spiral and at a second position to the medial terminus of the second spiral;
   wherein the run of material is continuous.

2. The article of claim 1 wherein the run of material comprises a continuous tow of fiber from the lateral terminus of the first spiral to the lateral terminus of the second spiral.

3. The article of claim 1 wherein the first spiral is a conjoined conical spiral.

4. The article of claim 1 wherein the first spiral and the second spiral are conjoined with each other.

5. The article of claim 1 wherein the run of material is deposited from the lateral terminus of the first spiral to the medial terminus of the first spiral, and wherein the run of material is deposited from the medial terminus of the second spiral to the lateral terminus of the second spiral.

6. The article of claim 1 wherein the article is a duct comprising a conjoined stack of conjoined planar spirals, wherein the conjoined stack comprises the first spiral and the second spiral.

7. The article of claim 1 wherein the article is a duct comprising a conjoined stack of rectangular-with-rounded-corners spirals, wherein the conjoined stack comprises the first spiral and the second spiral.

8. An article of manufacture comprising:
a first spiral of a run of material that comprises a medial terminus and a lateral terminus;
a second spiral of the run of material that comprises a medial terminus and a lateral terminus; and
a first inter-spiral yoke of the run of material connected at a first position to the medial terminus of the first spiral and at a second position to the medial terminus of the second spiral;
wherein the first spiral is a conical spiral.

9. The article of claim 8 wherein the run of material comprises a continuous tow of fiber from the lateral terminus of the first spiral to the medial terminus of the second spiral.

10. The article of claim 8 wherein the first spiral is a conjoined conical spiral.

11. The article of claim 8 wherein the first spiral and the second spiral are conjoined with each other.

12. The article of claim 8 wherein the run of material is deposited from the lateral terminus of the first spiral to the medial terminus of the first spiral, and wherein the run of material is deposited from the medial terminus of the second spiral to the lateral terminus of the second spiral.

\* \* \* \* \*